April 18, 1967 F. J. HEMMER 3,314,395

THIN FILM CIRCUIT VACUUM PROCESSING FACILITY

Filed Oct. 23, 1964 13 Sheets-Sheet 1

INVENTOR
FERDINAND J. HEMMER

BY Hurvitz & Rose

ATTORNEYS

INVENTOR
FERDINAND J. HEMMER

INVENTOR
FERDINAND J. HEMMER

April 18, 1967 F. J. HEMMER 3,314,395

THIN FILM CIRCUIT VACUUM PROCESSING FACILITY

Filed Oct. 23, 1964 13 Sheets-Sheet 4

INVENTOR

FERDINAND J. HEMMER

INVENTOR
FERDINAND J. HEMMER

INVENTOR
FERDINAND J. HEMMER

THIN FILM CIRCUIT VACUUM PROCESSING FACILITY

Filed Oct. 23, 1964 13 Sheets-Sheet 7

INVENTOR
FERDINAND J. HEMMER

INVENTOR
FERDINAND J. HEMMER

INVENTOR
FERDINAND J. HEMMER

INVENTOR
FERDINAND J. HEMMER

INVENTOR
FERDINAND J. HEMMER

INVENTOR
FERDINAND J. HEMMER

INVENTOR
FERDINAND J. HEMMER

3,314,395
THIN FILM CIRCUIT VACUUM PROCESSING FACILITY

Ferdinand J. Hemmer, Alexandria, Va., assignor to Melpar, Inc., Falls Church, Va., a corporation of Delaware Filed Oct. 23, 1964, Ser. No. 405,964
29 Claims. (Cl. 118—49)

The present invention relates generally to vacuum vapor deposition facilities for fabricating thin film circuits, and more particularly to a thin film fabricating facility wherein substrates and masks are carried by a movable arm from the storage station to a deposition station where evaporant is deposited on the substrate according to a mask configuration at the deposition station.

Vacuum deposited thin film circuits are generally fabricated by vaporizing resistive, semi-conductive and dielectric materials on insulating substrates, such as glass, quartz, or glazed alumina. The film thicknesses, generally on the order of 100 to 10,000 Angstrom units, geometric shapes of the deposited material and electrical characteristics of the deposited films are dependent upon the desired electrical characteristics of the particular circuit being fabricated.

Generally, thin films are formed in a vacuum by heating a source mtaerial, frequently referred to as an evaporant, to a temperature high enough to cause vaporization. At vaporization the vapor pressure of the source generally exceeds the total pressure of the residual gases in the vacuum chamber by a factor of at least one thousand. When the vapor escapes from the source material, it travels in a relatively unimpeded path until it contacts the relatively cool substrate surface, where it condenses and solidifies. The geometric configuration of the film deposited is determined by a mask that is disposed in proximity to the substrate surface on which the film is being formed, the mask located between the substrate and the evaporant source. The thickness of each film is determined by the length of time that the evaporant is deposited on the substrate.

Considerable time is generally expended, in the prior art facilities for forming thin film circuits, in heating the substrates prior to and after deposition of a particular film. A further factor increasing the length of time required to produce thin film vacuum vapor deposited circuits is the outgassing process whereby the substrates, masks and evaporant sources must be heated prior to initial deposition of any material on a substrate so that adsorbed gases thereon do not contaminate the substrate and films during the deposition process.

In the most elementary facilities, each time a film is formed, it is necessary to open the vacuum chamber, insert a new mask and a new evaporant source. Of course, this is time consuming and the resulting exposure to the atmosphere of the film that has been formed on the substrate frequently changes the film characteristic in a detrimental manner. More sophisticated facilities have been devised for producing vacuum deposited thin film circuits in quantity. According to one of the prior art approaches, an assembly line technique is employed whereby the circuit being processed is passed through a plurality of deposition stations, in sequence. Each deposition station must include an evaporant source, a shutter utilized to control accurately the length of time vaporized material reaches the substrate, a mask and a register for maintaining the mask and substrate in alignment. In addition, each station is provided with a heater for the substrate because the substrate frequently must be maintained at an elevated temperature on the order of 200° C. during deposition. Each station is usually provided with a substrate temperature monitor, apparatus for measuring film thickness, resistance and deposition rate. Substrates are transported in sequence between the various work stations by a conveyor belt. When the operation at each station is completed, the conveyor is advanced so that the substrate is moved forward to the next deposition station. Generally, all the work stations start out in depositing material at the same time. Because, however, different materials evaporate at different rates and different thicknesses are required for the various films being formed, certain stations are idle while others are involved in a deposition step. The disparity in the deposition times of the various stations may range from a few minutes to several hours so that a very expensive station is needlessly tied up in an inefficient manner merely because another station along the conveyor belt is still involved in a deposition operation.

The other generally employed type of facility is analogous to a general purpose machine tool wherein all fabrication processes are performed at a single work station. In these facilities, evaporant materials, masks and substrates are removed from a storage area and transported to a deposition station where all fabrication processes are performed and the finished products, thin film circuits, are returned to storage. Thus, in this type of facility, a work station is never idle as there is no need to wait for other stations handling relatively slow operations to catch up with the single work station. The time required to fabricate a multiplicity of circuits is the sum total of the duration of each operation in addition to the time required to position substrates, masks and sources and to stabilize substrate and source temperatures.

The prior art single station facilities have usually included a plurality of turntables located in a single, bell jar type vacuum chamber. Deposition stations are located around the circumference of the circular chamber and the substrates are mounted on one of the rotatable turntables. In one prior art device, the source and masks are also mounted on turntables and a deposition station is formed when the evaporant source, mask and substrate are all aligned. In this arrangement, deposition takes place at only a single location within the vacuum chamber so that only a single substrate heater need be employed.

In another prior art single chamber facility, five special purpose deposition stations are provided around the circumference of the circular vacuum chamber. Three of the deposition stations are provided with an evaporant source utilized for forming thin films of highly conductive metals that form capacitor plates and interconnecting leads on the substrates. The substrates are stored on and transported between deposition stations by a turntable. The turntable is capable of holding up to as many as 20 different substrates and of bring these substrates into one of the five special purpose deposition stations.

At each deposition station a single mask is provided that is aligned with the substrate of interest. The substrate is brought into alignment with the mask by simultaneous rotation and upward movement of the substrate carrying turntable so that the masks and substrates are not in contact during turntable rotation. Prior to the commencement of a deposition operation, the mask and substrate are aligned by lowering the table so that tapered guide pins on the mask engage holes on the substrate holder. Since each station is provided with only one mask, plural deposition stations must be provided for depositing the same material if that material is to be formed on the substrate in different geometrical configurations.

Another disadvantage attendant with many of the foregoing described facilities resides in their use of electric motors and solenoids in activating the various mechanical mechanisms required. Electric motors and solenoids generally contain organic materials that vaporize at the temperatures and pressures required for a vacuum vapor deposition thin film facility. Apparently, vaporization of these organic materials frequently results in contamination of the films formed, resulting in poor adhesion and unpredictable electrical characteristics. Some of the prior art facilities have avoided the use of electric motors and solenoids within hot regions of the chamber by positioning these drivers in cool portions of the chamber and employing complex linkages extending between the motors and solenoids and the activated elements. Because of frictional problems attendant with high vacuum systems, the use of these complex mechanisms has not proven satisfactory.

Another problem often encountered in the prior art facilities is the slow rate at which substrates are heated and cooled and the non-uniform temperature variations that exist between adjacent substrates and even on the same substrate during a single deposition operation. This problem appears to occur in the prior art devices because the substrates are frequently mounted in proximity to massive parts that are subject to fairly great temperature gradients.

The present invention avoids these difficulties of the prior art facilities, basically, by employing a single movable arm that transports pallets on which substrates and masks are mounted, between a storage station and a deposition station. The arm is provided with two degrees of freedom, rotation and vertical translation, to transport the pallets between the storage racks and deposition station which are located at approximately the same distances from the center of the vapor deposition facility, where a shaft that carries the arm is located. Because a series of masks may be brought from the storage station to the deposition station while a single substrate pallet is mounted at the deposition station, the inflexibility and limited capacity of the pror art facilities is obviated.

Selectvely positioned beneath the deposition station is one of a multiplicity of evaporant sources that are carried on a rotatable turntable. Thus, the facility of the present invention does not inefficiently utilize the deposition station in a manner similar to that of the prior art conveyor belt type wherein several evaporant sources require several deposition stations.

A further feature of the invention resides in the utilization of pneumatic activators for energizing the various mechanical elements utilized. These pneumatic activators are coupled through air lines to valves located exteriorly of the vacuum deposition facility so that both problems attendant with prior art use of electric motors is obviated.

An additional feature of the invention involves suspending the substrate heating elements at a position that is effectively isolated in heat transfer relation from any massive parts. This is accomplished through the use of plural stacked reflectors that are interposed between any massive parts and the heating element. Each heating element electrode is connected to a U-shaped spring contact that is urged against it to maintain electrical contact for substrate temperature variations between 25° C. and 1000° C. Because of the extreme temperatures encountered at the deposition station, the substrate spring contacts and reflectors are made of stable materials, molybdenum and tantalum, that do not vaporize at low temperatures and yet perform admirably to serve the desired function. In addition, the spring contacts are located outside the reflectors to minimize their temperatures.

It is, accordingly, an object of the present invention to provide a new and improved facility for manufacturing vapor deposited thin film circuits.

It is another object of the present invention to provide a new and improved thin film vapor deposition fabricating facility wherein multiple films on a multiplicity of substrates are formed each time the vacuum chamber is evacuated.

Still another object of the present invention is to provide a new and improved thin film vapor deposition facility for fabricating thin film circuits having highly predictable electrical characteristics and films that adhere properly to the substrates on which they are being formed and are not subject to contamination.

A further object of the present invention is to provide a new and improved thin film vapor deposition facility wherein thin film circuits are produced at a relatively rapid rate and a large number of differing resistive, dielectric and semi-conductive geometrical configurations may be formed on the substrate surface where the deposit is being made.

Still another object of the present invention is to provide a new and improved thin film vapor deposition facility wherein the mask that controls the geometrical configuration of the circuit formed is accurately aligned and registered throughout the deposition process and many differing masks can be accurately aligned with the same substrate.

Still an additional object of the present invention is to provide a vacuum vapor deposition facility wherein substrate temperature is maintained relatively constant at any value between 25° C. and 1000° C. and rapid heating and cooling of substrates is attained.

It is yet another object of the present invention to provide a new and improved vacuum vapor deposition thin film fabricating facility wherein binding and galling of moving parts, frequently problems because of the extreme temperature variations encountered and high coefficients of friction of materials when they are in vacuo, are virtually eliminated.

Still another object of the present invention is to provide a new and improved vacuum vapor deposition thin film fabricating facility wherein the number of available masks is quite large and the masks may be transported to a deposition station in any sequence.

It is still another object of the present invention to provide a vacuum vapor deposition thin film facility wherein registraiton between the substrate and mask is precise and is little affected by changing temperatures of the substrate during several depositions.

Yet an additional object of the present invention is to provide a new and improved vacuum vapor deposition facility designed to handle a multiplicity of circuit configurations on a large number of substrates during a single pumpdown and outgassing operation of the vacuum chamber, wherein positioning of the masks and substrates at the deposition station may be achieved in any random sequence.

Still another object of the present invention is to provide a vacuum vapor deposition facility for fabricating plural thin film circuits during a single evacuation wherein the time duration each mask and substrate combination stays at the deposition station is independent of deposition operations for other mask configurations and evaporant sources.

Still another object of the present invention is to provide a vacuum vapor deposition facility that does not require electric motors and solenoids for activating movable mechanical mechanisms so that possible problems of contamination associated with such electrical apparatus being interiorly located of the vacuum chamber are obviated as is the need for complex mechanical linkages extending between the interior and exterior of the chamber or between hot and cool regions of the chamber.

Yet another object of the present invention is to provide a vacuum vapor deposition facility wherein substrates and masks are stored in locations remote and independent of the deposition station and the storage station may be utilized interchangeably for either the mask or substrates.

Still a further object of the present invention is to provide a thin film vapor deposition facility wherein a single positioning mechanism performs the several functions of transporting substrates and masks between storage and deposition stations, positioning heat and vapor shields that cover these substrates and masks during storage and moving circuits to the viewing port for visual inspection.

Yet an additional object of the present invention is to provide a thin film vapor deposition facility employing a movable arm, having freedom of movement rotationally and vertically, which arm carries substrates and masks between a storage station and a deposition station, both of which are located at approximately the same radial distance from the pivot point of the arm.

Still another object of the present invention is to provide a vacuum vapor deposition facility for fabricating a plurality of different substrates with differing evaporant materials wherein a single heating source is employed for evaporating the several evaporant materials.

A further object of the present invention is to provide pallets for use in a vacuum vapor deposition thin film facility, which pallets are designed to carry substrates and masks to be transported from a storage facility to a deposition station by a carrier arm.

Still another object of the present invention is to provide a thin film vapor deposition facility having a new and improved substrate heater so that substrates temperatures may range from 25° C. to 1000° C. without having detrimental effects on the environments surrounding the heater.

Yet an additional object of the present invention is to provide a vacuum vapor deposition facility for fabricating thin film circuits, which facility employs a new and improved shutter that is quickly energized to cover the substrate when the required thickness of the film being deposited on the substrate has been attained.

Still another object of the present invention is to provide a new and improved facility for fabricating a multiplicity of thin film circuits, wherein the circuits may be formed on substrates having a wide variety of sizes.

Yet a further object of the present invention is to provide a vacuum deposition thin film fabricating facility that is economical in initial costs, economical to operate, wherein the equipment employed is efficiently utilized and downtime for changeover to production of differing circuits is very short.

The above and still further objects, features and advantages of the present invention will become apparent upon consideration of the following detailed description of one specific embodiment thereof, especially when taken in conjunction with the accompanying drawing, wherein.

Figure 1:
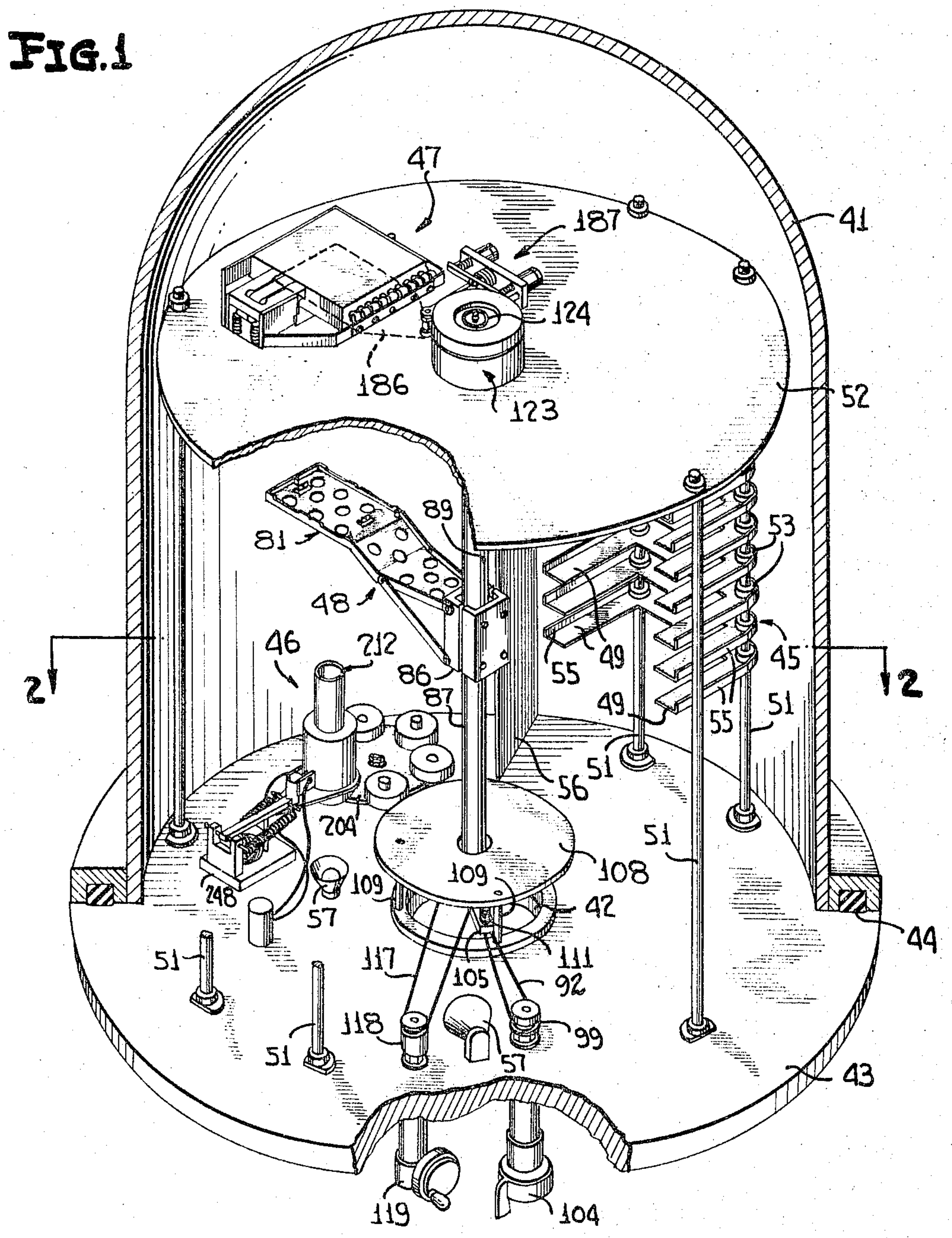
FIGURE 1 is a perspective view of the interior mechanism of the thin film fabricating facility according to a preferred embodiment of the present invention, with the vacuum bell jar partly cutaway.
Figure 2:
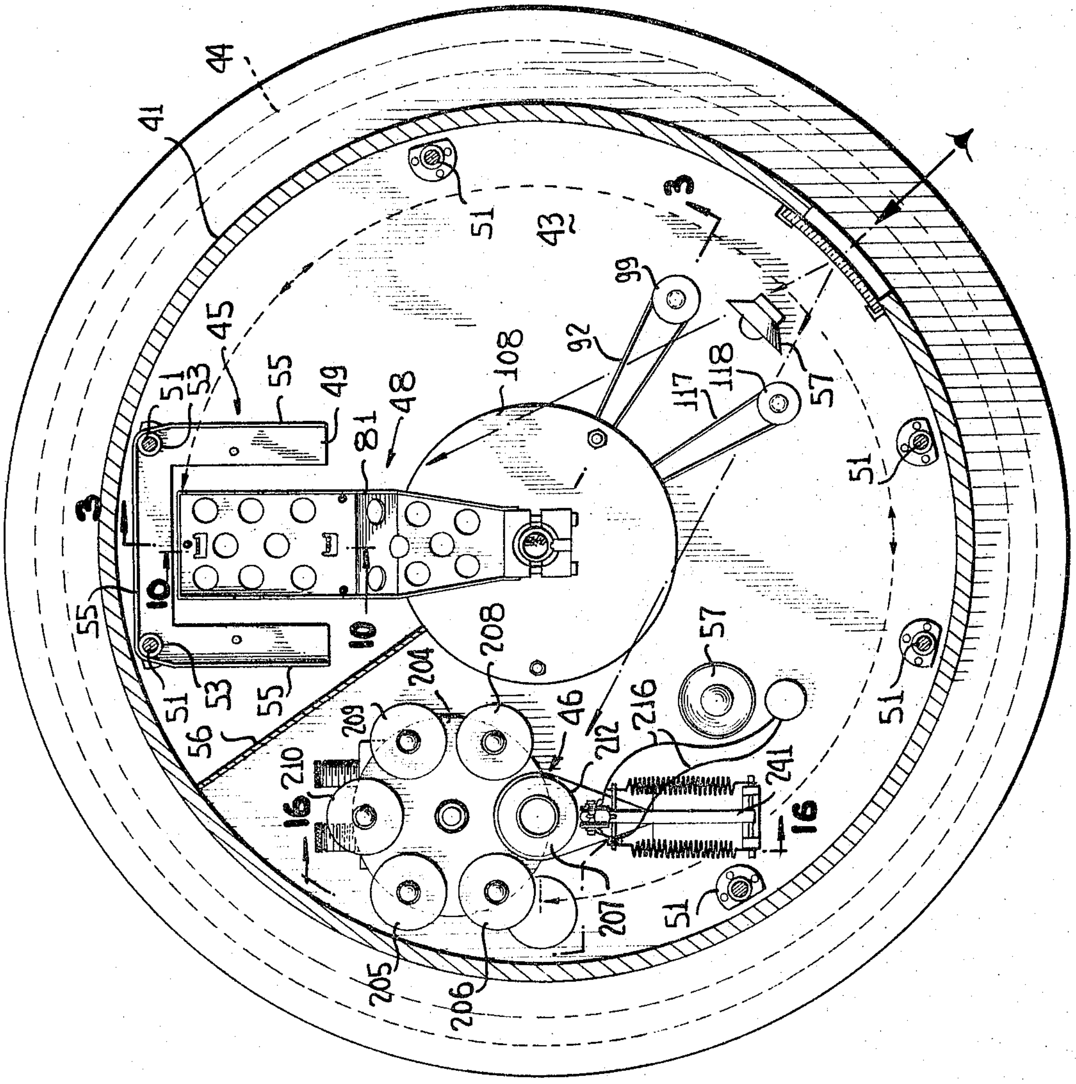
FIGURE 2 is a top view of the interior of the facility illustrated in FIGURE 1.
Figure 28A:
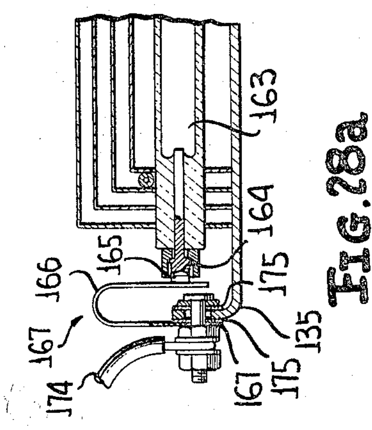
Figures 3, 4:
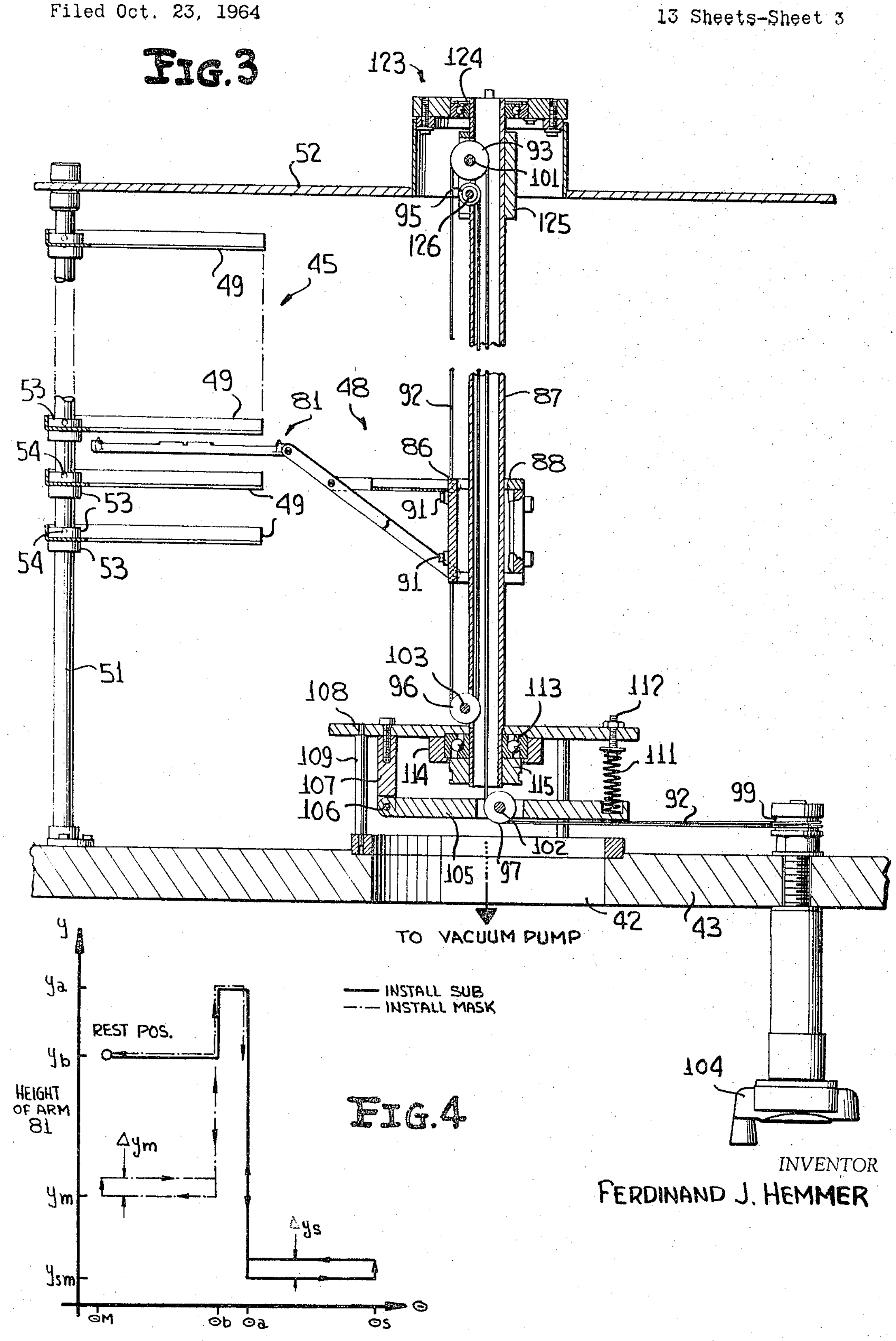
FIGURE 3 is a side sectional view taken along the lines 3—3 of FIGURE 2, illustrating the pulley and transporting arm particularly.
Figure 3A:
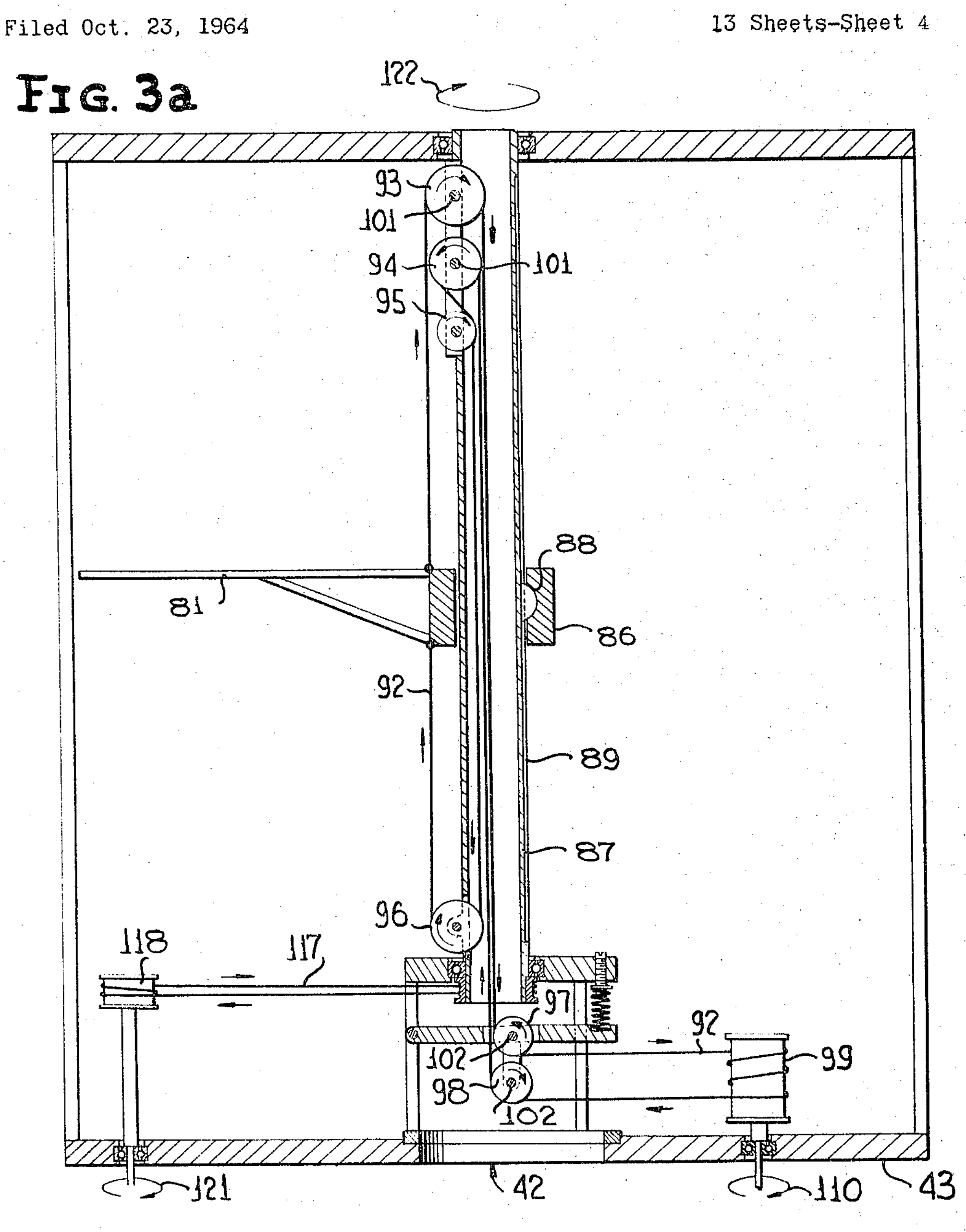
Figure 10:
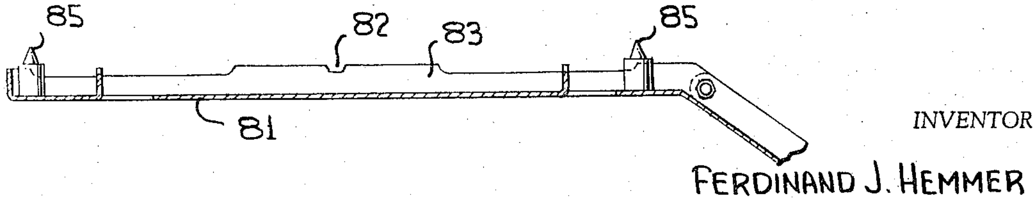
Figure 9:
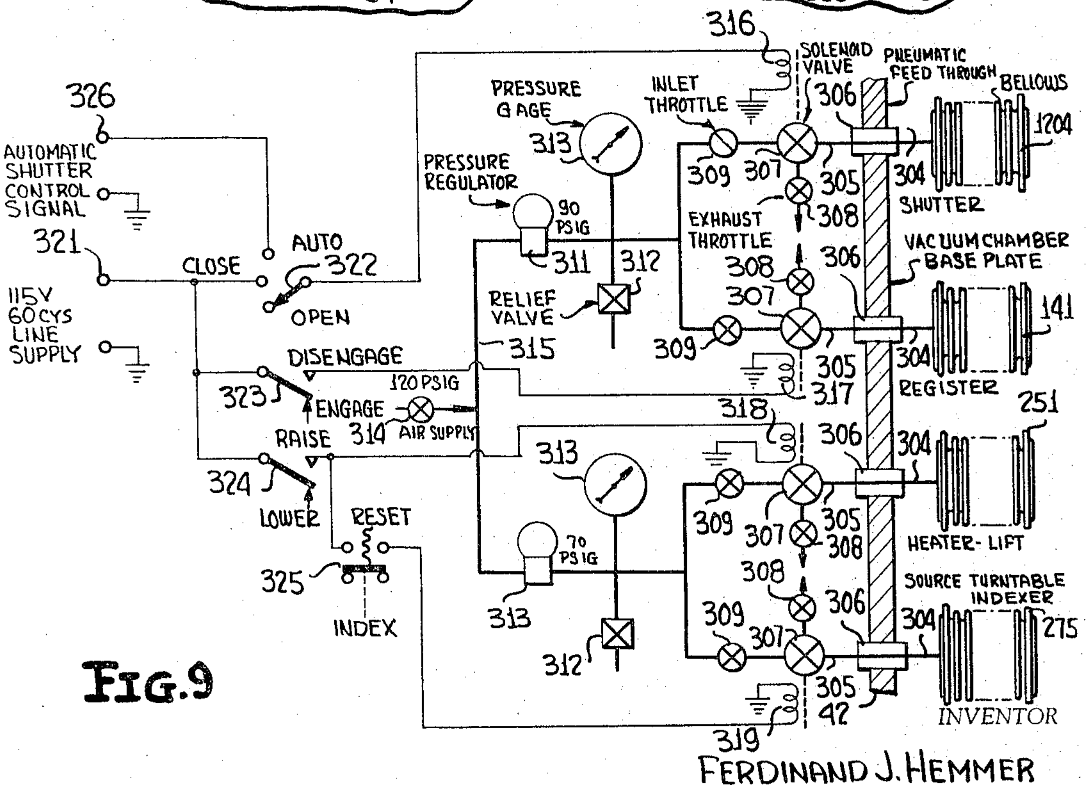
Figures 11, 12:
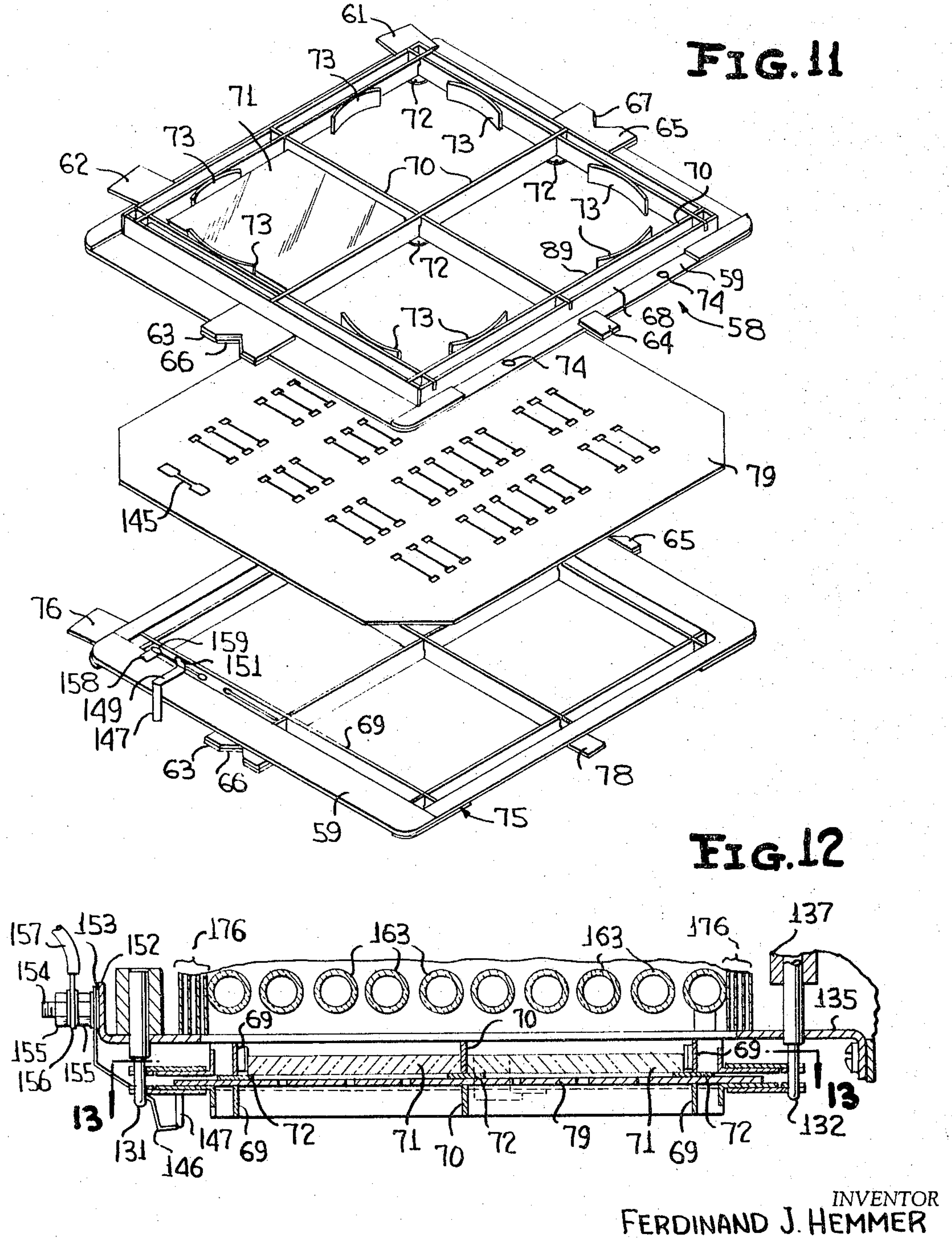
Figure 13:
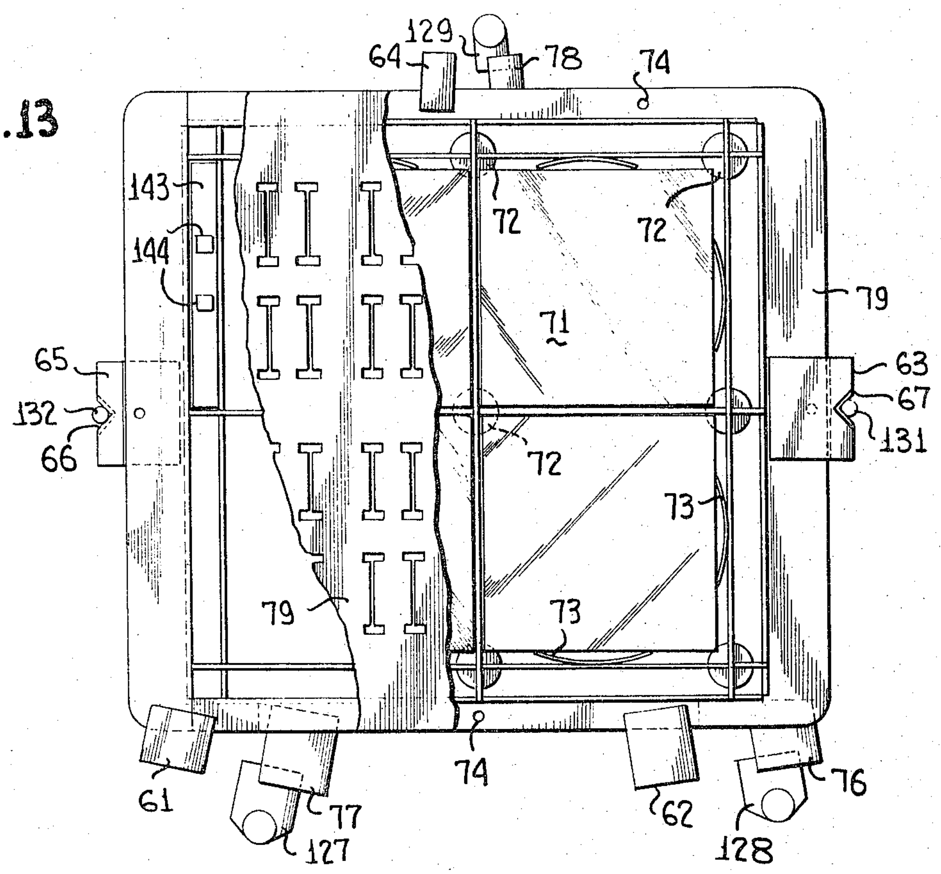
Figure 14:
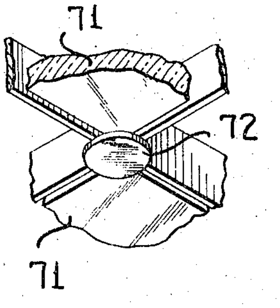
Figure 15:
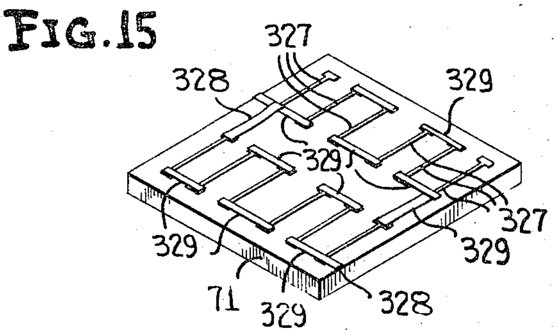
Figure 16:
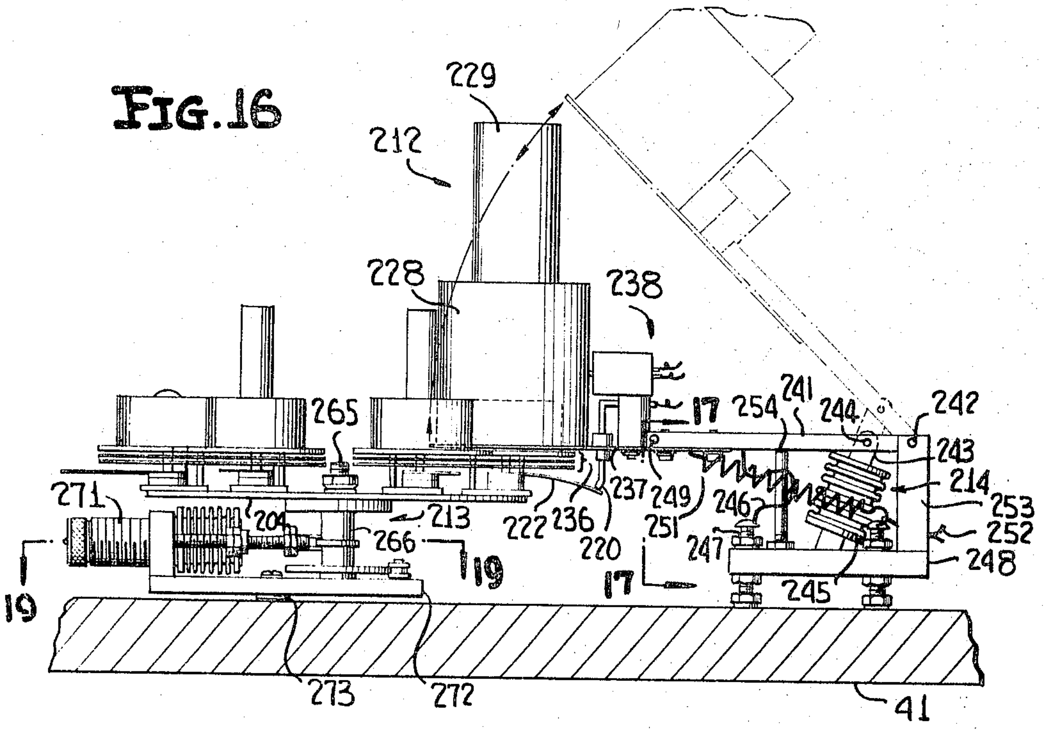
Figures 17, 18, 23A:
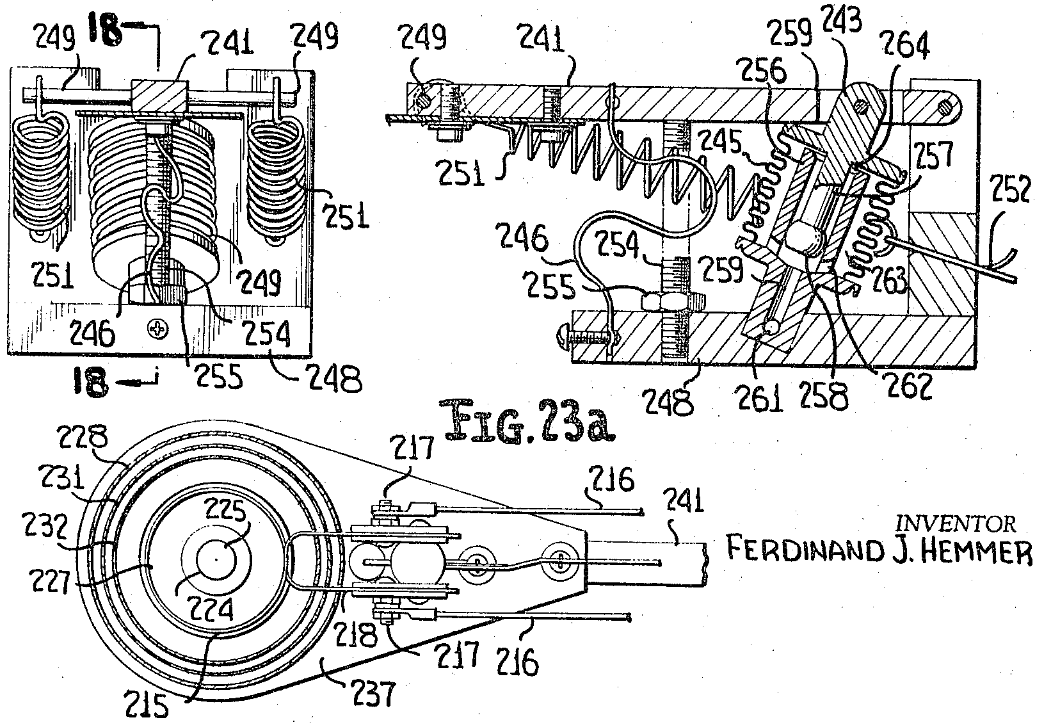
Figure 19:
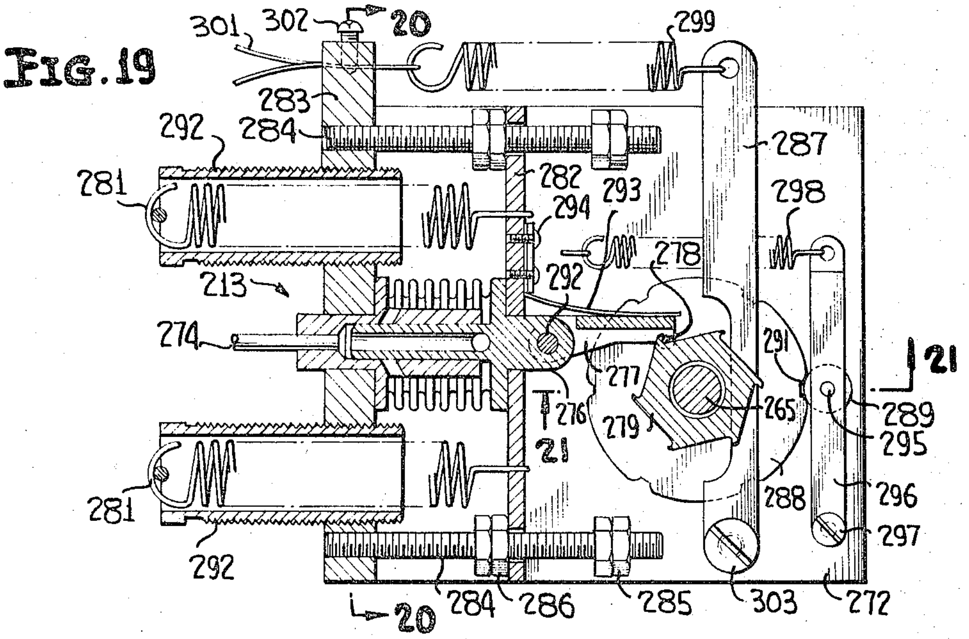
Figure 20:
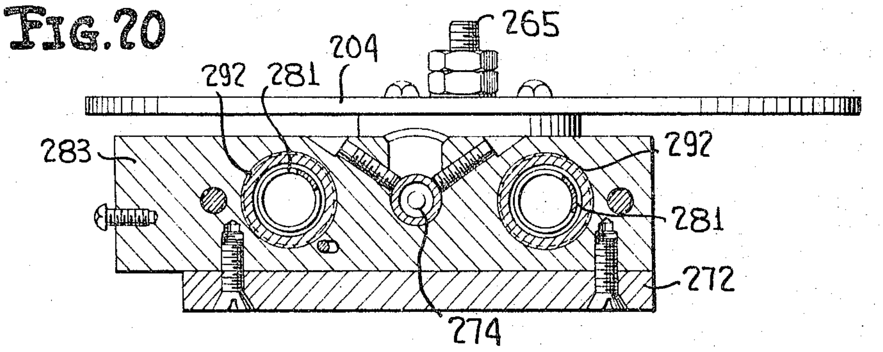
Figure 21:
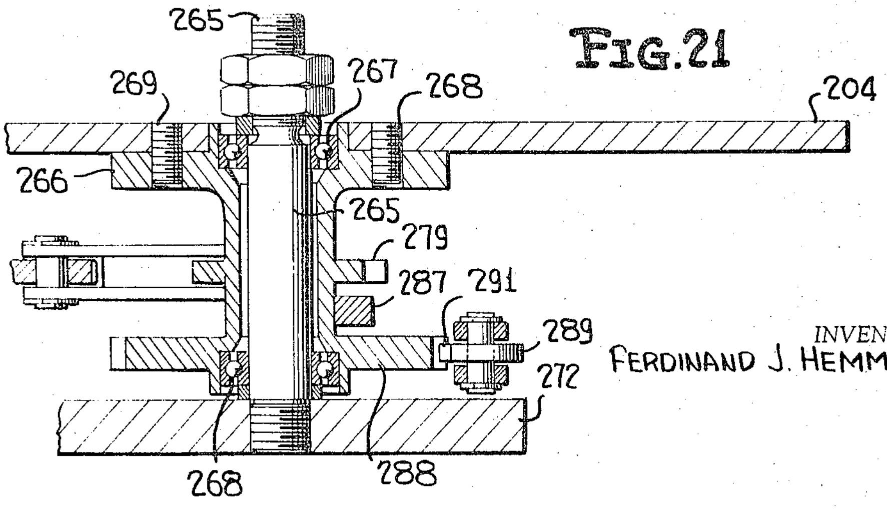
Figures 22, 23, 23B:
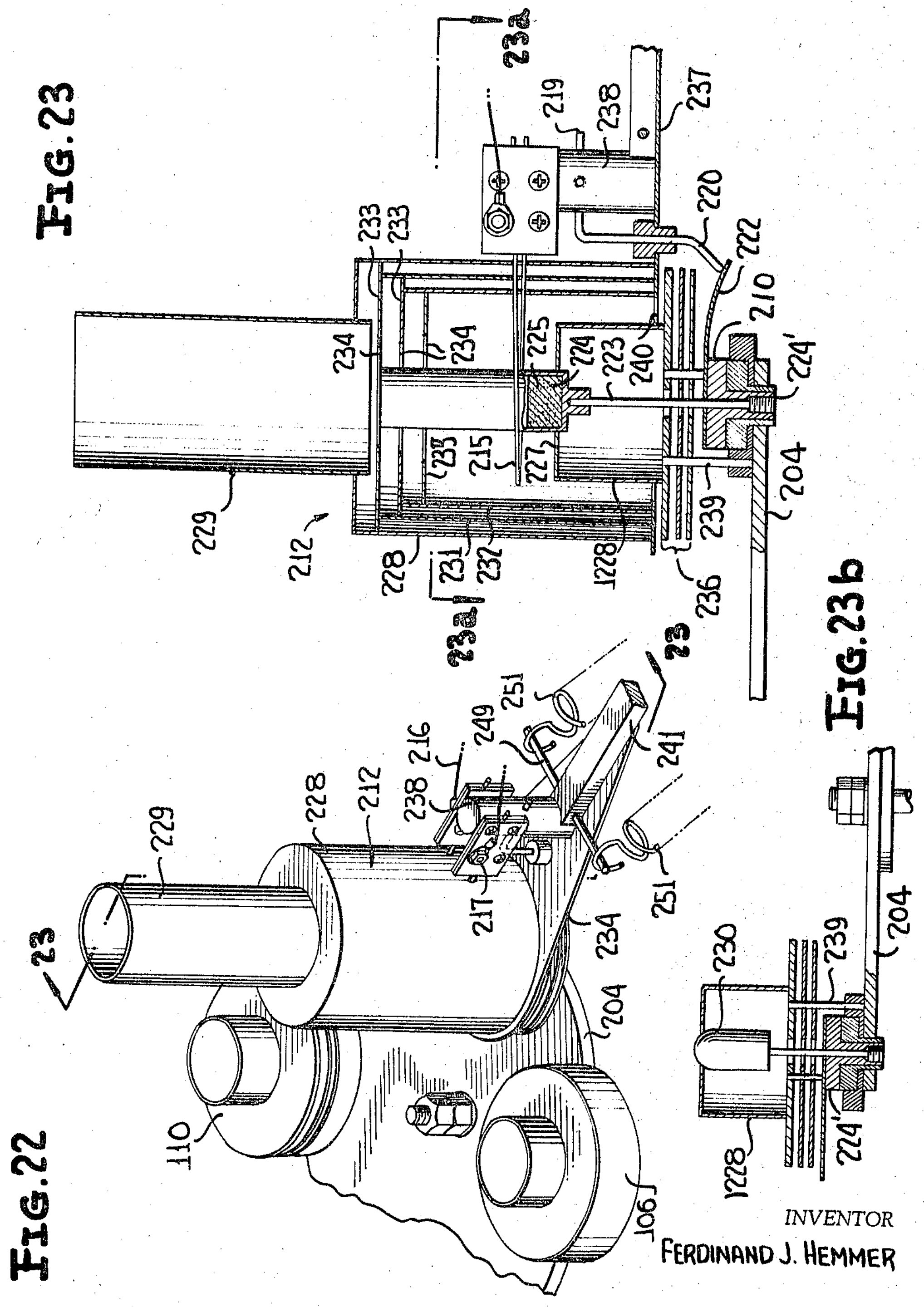
Figures 25, 26, 27:
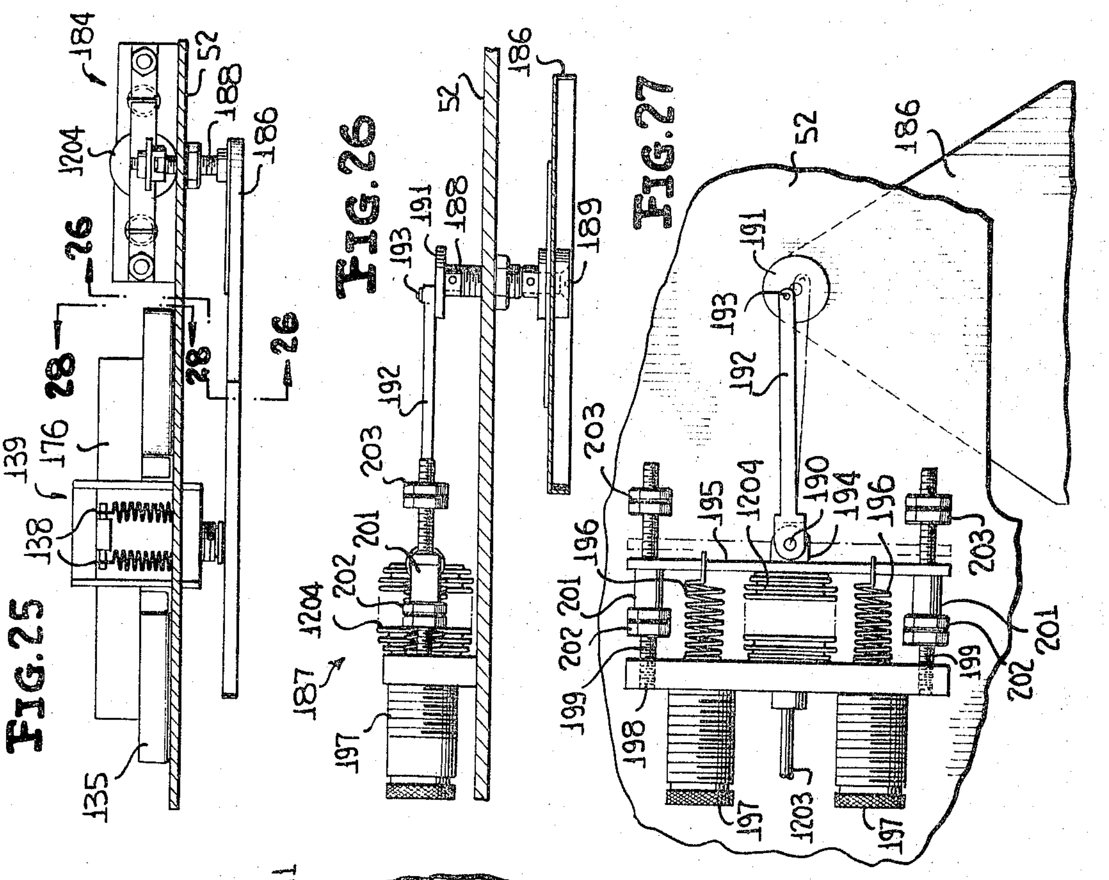
Figure 24:
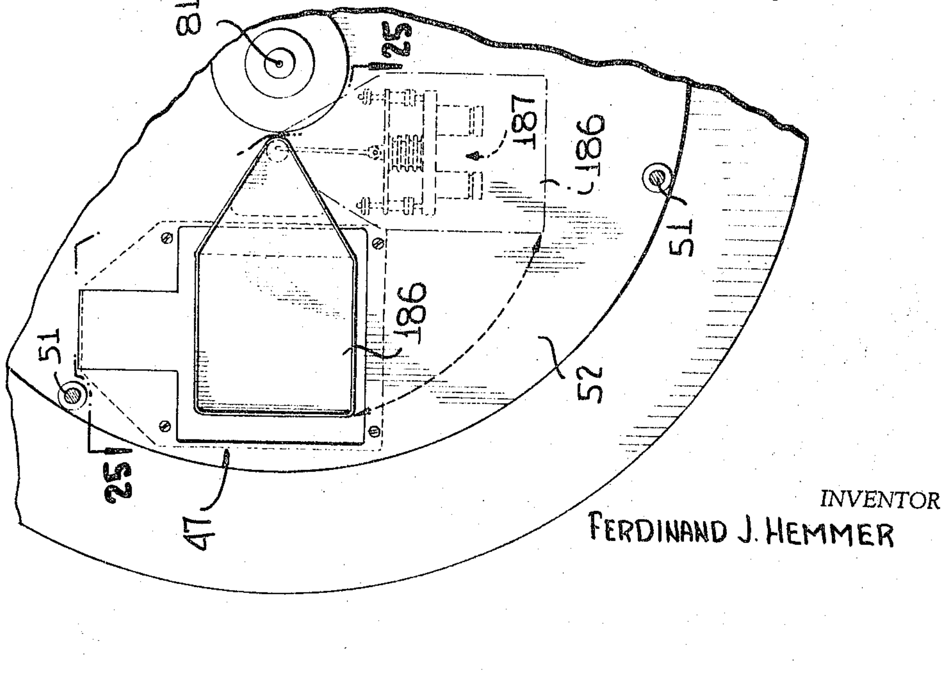
Figure 28:
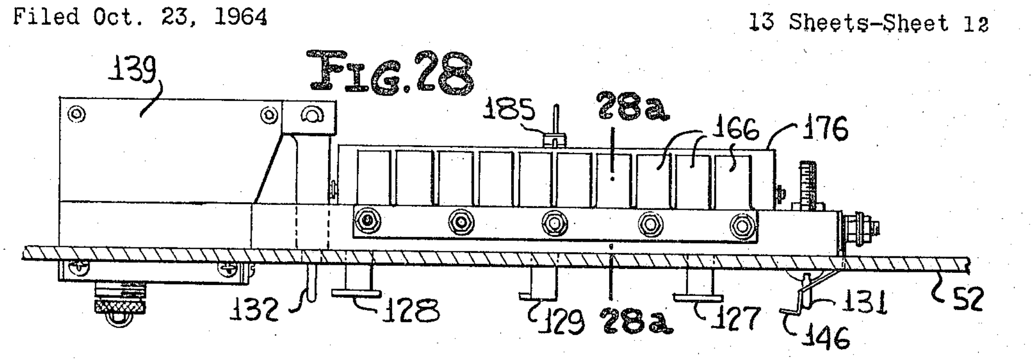
Figure 29:
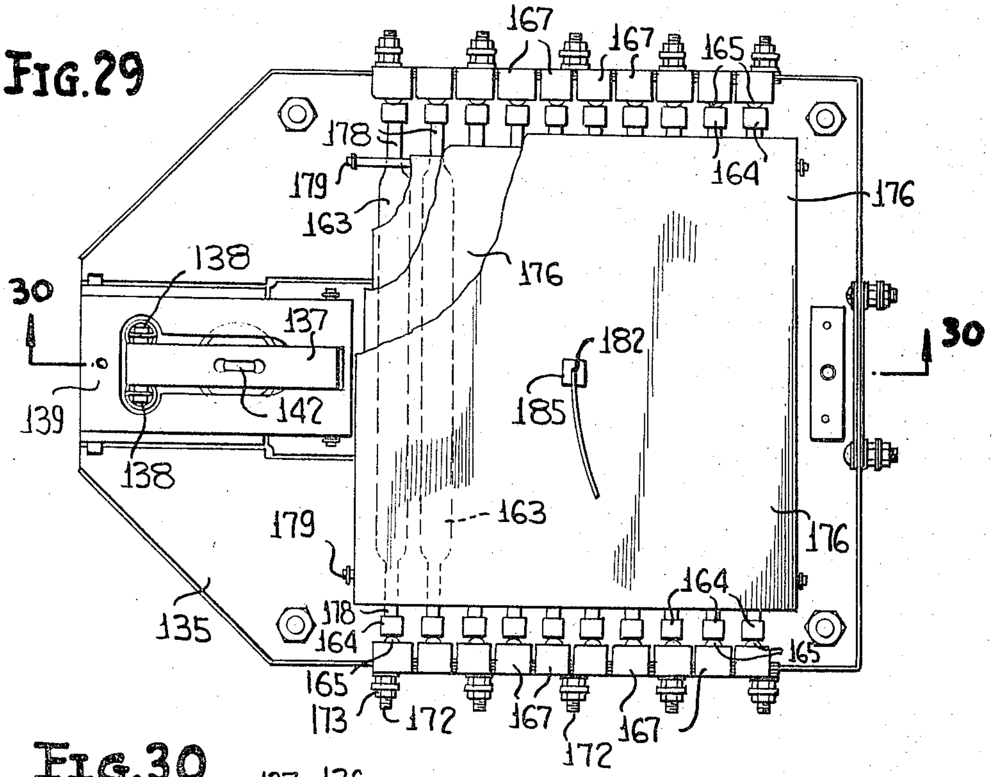
Figure 30:
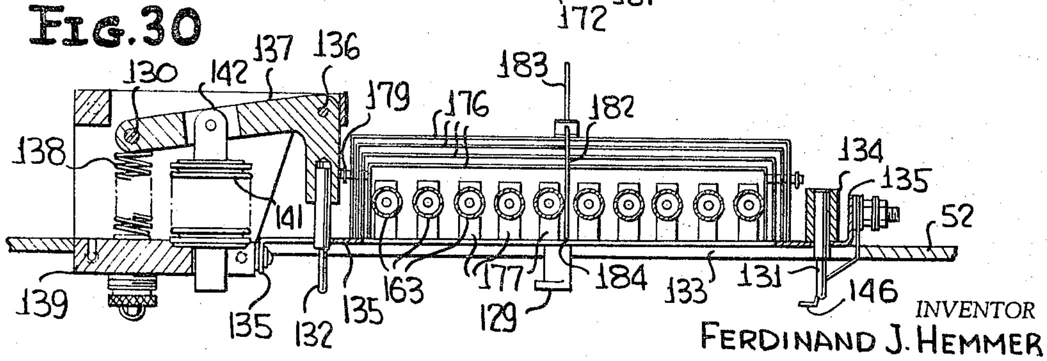
Figures 31, 32, 33:
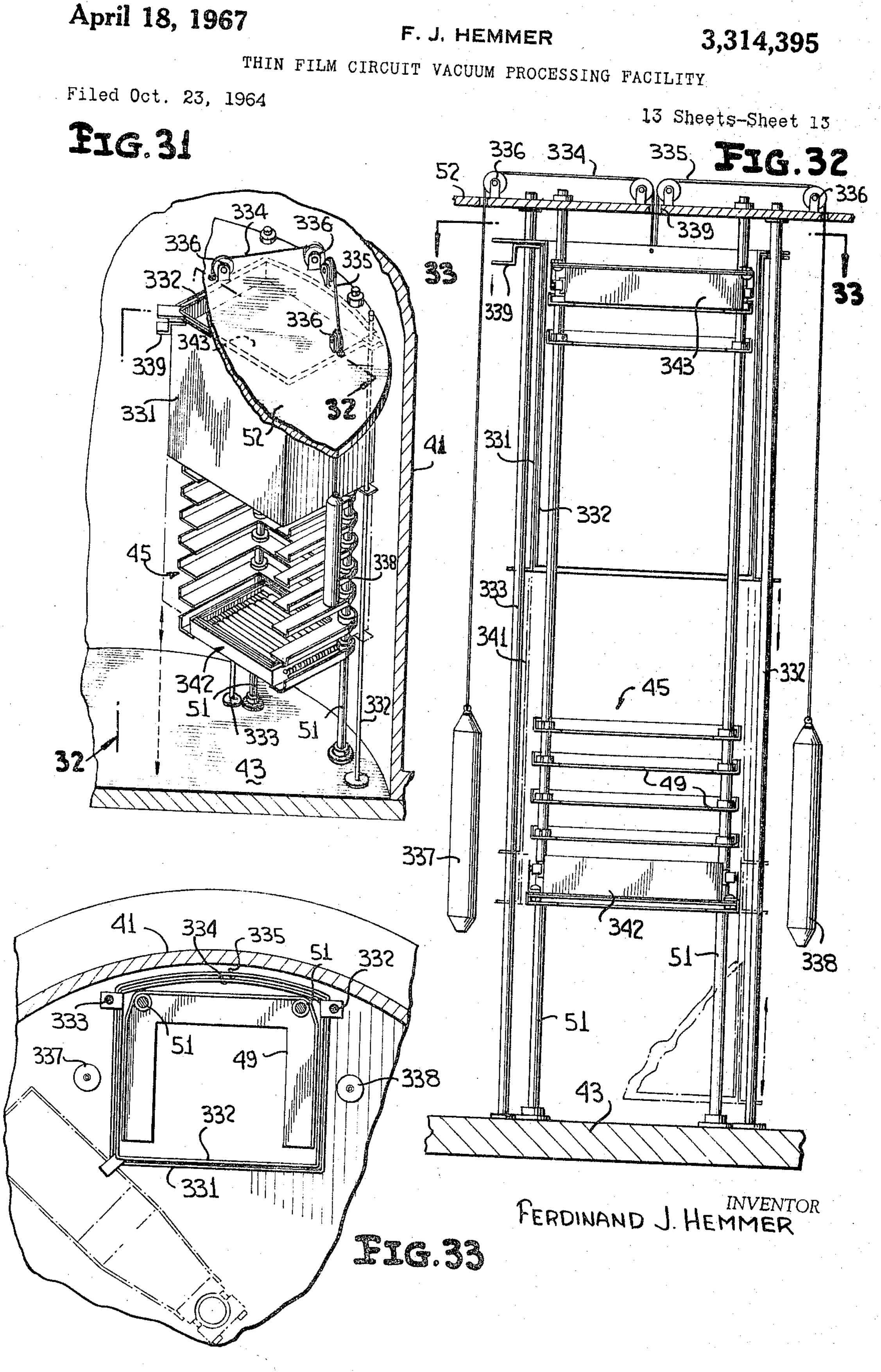

FIG. 3*a* is a schematic view of a pulley mechanism illustrated in FIGURE 3;

FIGURE 4 is a diagrammatic showing of the manner whereby substrate mask and pallets are transferred from the storage rack to the deposition station;

FIGURES 5–8 illustrate the manner in which the substrate and mask pallets are located in the deposition station;

FIGURE 9 is a circuit diagram illustrating the electrical and pneumatic connections for the various bellows actuators utilized in the vacuum deposition chamber of FIGURE 1;

FIGURE 10 is a view showing details of the transporting arm;

FIGURE 11 is an exploded view showing a substrate and substrate pallet in combination with a mask and mask pallet;

FIGURE 12 is an elevation view of a substrate pallet and mask pallet in situ at the deposition station in combination with the substrate heater;

FIGURE 13 is a top view taken along the lines 13—13,

FIGURE 12, illustrating in partial section the substrate pallet, mask and mask pallet;

FIGURE 14 is a detailed view illustrating the manner whereby substrates are held in place with the aid of a disk on the substrate pallets;

FIGURE 15 is a perspective view of a finished thin film circuit fabricated with the apparatus of the present invention;

FIGURE 16 is an elevation view taken along the lines 16—16 of FIGURE 2, illustrating the multiple source assembly;

FIGURE 17 is an elevation view taken along the lines 17—17, FIGURE 16, illustrating the bellows actuator specifically utilized for raising the evaporant heater during source changes;

FIGURE 18 is a side sectional view taken along the lines 18—18, FIGURE 17, further illustrating the heater lift mechanism;

FIGURE 19 is a top sectional view taken along the lines 19—19, FIGURE 16, illustrating the mechanical movement for rotating the platform that carries the various evaporant sources;

FIGURE 20 is a side sectional view taken along the lines 20—20, FIGURE 19, further illustrating the mechanical actuator for rotating the table that carries the evaporant source illustrated in FIGURE 16;

FIGURE 21 is a side sectional view taken along the lines 21—21, FIGURE 19, illustrating the detenting mechanism utilized for controlling rotation of the platform carrying the evaporant in FIGURE 16;

FIGURE 22 is a perspective view of the heater employed to evaporate materials carried on the rotatable table in FIGURE 16;

FIGURE 23 is a side sectional view taken through the lines 23—23, FIGURE 22, illustrating, in detail, the heater in combination with a crucible for carrying evaporant;

FIGURE 23*a* is a top view of the heater in combination with a crucible;

FIGURE 23*b* is a side sectional view of an evaporant source that does not require a crucible;

FIGURE 24 is a view looking from the bottom, upwardly, toward the shutter and deposition station illustrated in FIGURE 1;

FIGURE 25 is a side sectional view taken along the lines 25—25, FIGURE 24, showing details of the shutter actuator;

FIGURE 26 is a side sectional view taken along the lines 26—26, FIGURE 25, further showing the bellows actuator for the shutter;

FIGURE 27 is a top view further illustrating the shutter actuator;

FIGURE 28 is a side sectional view taken along the lines 28—28, FIGURE 25, showing the heater and register;

FIGURE 28*a* is a side sectional view taken along the lines **28*a*—28*a***, FIGURE 28, showing the heater contact spring and electrode;

FIGURE 29 is a top view, partially cut away, illustrating the heater at the deposition station;

FIGURE 30 is a side view taken along the lines 30—30, FIGURE 29, illustrating the heater in combination with the pallet registration apparatus at the deposition station;

FIGURE 31 is a perspective view illustrating a shield for the storage rack, according to a further modification of the present invention;

FIGURE 32 is a side view illustrating the shield embodiment of FIGURE 31; and

FIGURE 33 is a top view taken through the lines 33—33, FIGURE 32, illustrating the manner in which the arm engages the shield.

Reference is now made to FIGURES 1, 2, 3, and 3*a* to provide an overall view of the vacuum vapor deposition, thin film circuit fabricating facility according to the present invention. The facility is located within bell jar 41, and, when operating, is pumped to a vacuum from an external source, not shown, through circular aperture 42 in base plate 43 to approximately $10^{-5}$ mm. of mercury. The vacuum is maintained by conventional means through gasket 44 between bell jar 41 and base plate 43.

The facility within bell jar 41 comprises four main elements: namely, storage station 45, evaporant station 46, deposition station 47 and carriage 48. Storage station 45 carries numerous pallets having masks and substrates positioned thereon. The pallets are transported from storage station 45 by carriage 48 to a deposition station 47. At deposition station 47, vaporized material, usually a metal, dielectric or semiconductor, is received from evaporant station 46. The configuration of the mask located at deposition station 47 determines the geometric configuration of the particular material deposited upon the substrates located at the deposition station. The material deposited is selectively controlled at evaporant station 46. Thus, thin film circuits having different configurations and materials can be completely fabricated while the facility is evacuated a single time.

To enable an operator to see the nature of the substrates formed during a fabricating operation, without having to remove bell jar 41, lamps 57 are provided on base plate 43. These lamps enable an operator to see, by looking through a window, now shown, in bell jar 41, what operations are being performed and to manually operate the mechanism of the present invention.

Storage station 45 includes a plurality of vertically stacked, U-shaped carriers 49, carried by vertically extending rods 51 that connect top plate 52 with base plate 43. Each of U-shaped carriers 49 is secured to a pair of vertically extending rods or posts 51 by two rings 53, one of which is provided for each post. The rings 53 are welded to the U-shaped section of the carrier 49. The carriers 49 are secured in place on the rods 51 by means at a set screw 54 in each ring 53. Each of carriers 49 includes vertically extending flanges 55 on its three outer legs, with the inner segment of each carrier remaining flat to enable withdrawal and insertion of a pallet thereon. While only one column of U-shaped carriers (storage station 45) is specifically illustrated, it is to be understood that in a facility having increased capacity, a plurality of storage stations would be circumferentially disposed about the vacuum chamber. To prevent erroneous deposition of the material being evaporated on the substrates and masks stored on carriers 49, vertically extending partition 56 is provided between storage station 46, which partition extends completely between base and top plates 43 and 52, respectively.

Reference is now made to FIGURES 5–8, 11, 13 and 14 to illustrate the construction of the pallets utilized for carrying substrates and masks between storage station 45 and deposition station 47. In each of these figures, except FIGURE 14, these pallets are viewed from the top looking downwardly when they are loaded at storage station 45 or deposition station 47.

Substrate carrying pallet 58 comprises a generally open center, rectangular, sheet metal frame 59 having a plurality of tabs 61–65 extending from it in the horizontal plane. Tabs 63 and 65, having V-notches 66 and 67 therein, extend at right angles from opposite sides of frame 59 while tabs 61 and 64 are directed at slight acute angles to the left, and tab 62 extends at a slight acute angle to the right, as viewed from the top. Tabs 61 and 62 are located on the same edge of frame 59, with the latter tab being located farther from the left side of the frame than the former is located from the right side of the frame. Tab 64, on the edge of frame 59 opposite from tabs 61 and 62, is located slightly to the right of center. The reason for the placement and angular position of tabs 61, 62 and 64, in the manner described, is seen infra.

At the interior edge of frame 59 are four vertically extending sheet metal flanges 68, having four cross members 70 rigidly attached thereto at a slight distance from their corners. Bisecting the length of flanges 68 are cross members 69 that together with cross members 69 form a grid between which insulating substrate 71 is located. At each intersection of vertically extending cross members 69 and 70 there is provided a horizontally extending circular disk 72, occupying the same plane as frame 59. Disks 72 cooperate with leaf springs 73, located on outer cross members 69, to maintain substrates 71 in situ without covering a substantial area thereof. Thus, substrate 71 is held in place by leaf springs 73 that urge it against crossed member 70 while disk 72 prevents the substrate from falling or being translated to a position that it may become free from pallet 58.

If smaller area substrates are employed, the same size pallet 58 is utilized. However, additional cross members 70 must be employed with spacings closer than that illustrated for pallet 58 that is designed to receive four substrates simultaneously. The additional cross members in a pallet designed for more substrates must be provided with sufficient leaf springs 73 so that a pair of leaf springs engages orthogonal edges of each substrate.

To enable pallet 58 to be securely picked up by carriage mechanism 48, a plurality of circular locating apertures 74, FIGURE 11, are provided on frame 59. One locating aperture 74 is located midway between the sides of frame 73 while the other two apertures are located midway between the frame sides and center cross member 70, on the edge opposite from the first aperture.

Masking carrying pallet 75 is substantially like substrate pallet 58 although the former does not require disks 72, leaf springs 73 and locating apertures 74. Substrate pallet 75, in essence, except for these differences, is merely an inverted substrate pallet. Thus, in use, tab 76, at the left side of pallet 75, is closer than tab 77 is to the right side. Tab 78, on the opposite side of pallet 75 from tabs 76 and 77, however is located slightly to the left of the pallet center and forms a slight acute angle to the left, as viewed in FIGURES 11 and 13. As in the case of the pallet 58, cross members 69 and 70 of mask pallets 75 do not extend completely to the bottom surface of frame 59. Thereby, mask 79, having exterior dimensions virtually identical with the interior dimensions of frame 59, can be seated in the frame so it does not extend above the frame, while being supported by cross members 69 and 70. Contact between mask 79 and disks 72 of pallet 58 results in a small, well controlled clearance between mask 79 and substrates 71.

When pallets 58 and 75 are supported by U-shaped carrier 49, they are disposed in the positions illustrated in FIGURE 11, whereby vertically extending cross pieces 69 and 70 extend upwardly from frame 59 for pallet 58 and the opposite condition of the cross pieces prevails when pallet 75 is stored. The horizontal portions of U-shaped carrier 49 engage corresponding portions of frame 59 for the substrate and mask pallets.

To transport pallets 58 and 75 from storage station 45 to deposition station 47, carriage 48 is provided with arm 81, best seen in FIGURES 2 and 10. Arm 81 includes four tapered notches 82, two of which are aligned with each other on its parallel sidewalls 83 and the other two which are at right angles to wall 83 and are provided on tabs 84, located along the center line between walls 83. In transporting mask pallet 75 between storage station 45 and deposition station 47, cross members 70 of the pallet are engaged by notches 82 when arm 81 comes beneath the pallet to lift it from the U-shaped carrier 49 or when the arm engages the pallet in removing it from the deposition station.

To transfer substrate pallets 58 between storage station 45 and deposition station 47, arm 81 is provided with three vertically extending pins 85 having positions corresponding with locating apertures 74 in the substrate pallets. One pin 85 is located on the center line of arm 81 equidistant between sides 83 while the other two pins 85 are located adjacent sides 83 and aligned at a position almost at the back edge of arm 81. In transporting substrate pallets 58 from storage station 45, pins 85 come beneath the substrate pallet 58, lift it above vertically extending flanges 55 or U-shaped carrier 49 and carry it to the deposition station. In removing substrate pallet 58 from deposition station 47, pins 85 again engage aperture 74 from beneath the substrate pallet so that arm 81 is able to carry the pallet back to the storage station without the possibility of the pallet falling from the arm.

The description of the remainder of carriage mechanism 48 for actuating arm 81 requires reference to FIGURES 1, 2, 3 and 3*a*. Arm 81 is fixedly secured to bushing 86, that rides on shaft 87, located centrally of base plate 43 and bell jar 41. Key 88, rigidly secured to bushing 86, rides in key way 89 that extends throughout the length of shaft 87. Thereby, angular motion of arm 81 is coincident with rotation of shaft 87, but the arm is capable of being moved in elevation relative to the shaft.

Fixedly secured to bushing 86 by screws 91 is wire rope 92 that rides over pulleys 93–98 and drum 99. Pulleys 93 and 94 are mounted on common shaft 101 above base plate 52 and they rotate in opposite directions. Pulleys 97 and 98 are similarly mounted on common shaft 102 just beneath the lower end of shaft 87. Pulleys 93, 94, 97 and 98 are carried in pairs on identical shafts to increase the maximum travel of arm 81 and to facilitate fabrication of the arm activating mechanism. For purposes of schematic illustration, however, in FIGURE 3*a* these pulleys are shown as being disposed on separate shafts. Rope 92 extends from drum 99 around pulley 98 upwardly through the center hollow portion of shaft 87 around pulley 94 and engages the interior surface of pulley 95. From pulley 95, rope 92 extends downwardly through shaft 87 to pulley 96, mounted on shaft 103 that is carried by center shaft 87. After rope 95 turns about pulley 96, it continues upwardly, engaging bushing 86, and thence to the exterior surface of pulley 93. Rope 92 continues across pulley 93 and proceeds downwardly through shaft 87 to engage approximately one quarter of pulley 97. From pulley 97 rope 92 proceeds back to drum 99. Rotation of drum 99, by turning handle 104, located exteriorly of the chamber and beneath base plate 43, in the clockwise direction illustrated by arrow 105, FIGURE 3*a*, results in translation of rope 92 in a manner whereby arm 81 is lifted. Turning handle 104 in the opposite direction results in lowering of arm 81. This six pulley activating mechanism for elevating arm 81 is maintained under sufficient tension so that rope 92 does not slip on drum 99.

Tension for wire rope 92 is appropriately maintained by cantilevered platform 105 that carries shaft 102. Platform 105 is pivotably mounted at its left end about pin 106 that is rigidly secured to post 107. Post 107 extends vertically from the underneath side of table 108, having legs 109 that are secured to base plate 43 around the periphery of aperture 42. Proximate the edge of table 108 opposite post 107 is carried vertically extending screw 112 that is secured to one end of spring 111. The other end of spring 111 is fixedly secured to the end of platform 105 remote from pin 106 so that adjustment of screw 112, prior to positioning of bell jar 41 on base plate 43, adjusts the tension rope 92. Thereby, the tension cable 92 may be varied, as desired, by moving the vertical position of pulley 102. The arrangement also reduces variation in rope 92 tension caused by differing thermal expansion of rope 92 and shaft 87.

Table 108 also carries, on its underneath side, radial thrust bearing 113 for shaft 87, which bearing is maintained in place by housing 114 that is fixedly secured to the able. Secured to shaft 87, beneath bearing 113 by a set screw, not shown, is drum 115. Riding on drum 115 is a further wire rope 117 that extends to drum 118. Drum 118 is rotated in response to turning handle 119, located beneath base plate 43, so that rotation of the handle in the clockwise direction indicated by arrow 121 results in rotation of shaft 87 in the clockwise direction, indicated by arrow 122, FIGURE 3*a*.

Shaft 87 is fixedly mounted at its upper end by virtue of its connection to housing 123, that is secured at its lower end to the top edge of plate 52. Centrally located in the upper surface of housing 123 is radial thrust bearing 124 for shaft 87. Bearing 124 is fixedly mounted on housing 123 by means of a retaining screw and washer, not shown. Just below the lower plane of the top surface of housing 123 is mounting block 125 that carries shafts 101 and 126 for pulleys 93–95. Block 124 is fixedly mounted along a length of shaft 87 where a slot is provided for pulleys 93 and 95 to extend through the shaft.

Arm 81 is able to move with two degrees of freedom between storage station 45 and deposition station 47. The two degrees of freedom are elevation and rotation, with no radial movement of arm 81 being permitted. Therefore, stations 45 and 47 must be at the same radial distances from the center of shaft 87 to permit transfer of pallets between them.

Reference is now made to FIGURES 5–8, 12 and 24–30 to show the construction and operating mode of deposition station 47.

As best seen in FIGURES 5–8, 13 and 28, deposition station 47 includes three hooks 127–129 extending from the bottom side of plate 52. Hooks 127–129 are L shape with one leg of the L extending vertically and the other leg thereof extending horizontally parallel to the plane of plate 52. Hooks 127 and 128 are positioned at approximately the same radial distance from central shaft 87 and have their horizontal sections extending inwardly from its vertical section towards the central shaft while hook 129 is positioned at a lesser radial distance from shaft 87 and has its horizontal section extending outwardly. Hook 129 lies near the perpendicular bisector of the line connecting the closest points of hooks 127 and 128 together. The hooks are approximately aligned with radii from the shaft 87 center line. Hooks 127–129 are spaced from each other by approximately the same distance as tabs 61, 62 and 64 on substrate pallet 58 or tabs 76–78 on mask pallet 75. Hooks 127–129 are arranged relative to these tabs so that all of the tab surfaces can engage the hooks without touching the pallet frames.

To attain registration of pallets 58 and 75, deposition station 47 is provided with fixed pin 131 and translatable pin 132. Pins 131 and 132 extend vertically through aperture 133 in top plate 52, with the former being fixedly held by sleeve 134 that is mounted on bracket 135, which in turn is secured to the top plate. Pin 132 is fixedly carried on arm 137 that is pivotably mounted for rotation about pin 136, connected to the arm elbow. The end of arm 137 opposite from pin 132 is connected by shaft 130 to one end of biasing springs 138, the other ends of which are secured to the housing 139 that is fixedly mounted on top plate 52. Carried within housing 139 is bellows 141, that is activated in response to air pressure supply thereto from a line connected to a source exteriorly located from bell jar 41. The bellows output rod 142 is rigidly secured to arm 137 between the arm elbow and its connection spring 138.

In response to activation and expansion of bellows 141, rod 142 is translated upwardly, resulting in clockwise rotation of arm 137 about pin 136. Clockwise rotation of arm 137 causes pin 132 to be driven to the left, as viewed in FIGURE 30. When the air supply to bellows 141 is released, arm 137 is rotated in a counter clockwise direction due to the restraining force applied thereto by springs 138. Rotation of arm 137 in the counter clockwise direction restores pin 132 to the position illustrated in FIGURE 30.

Figure 5:
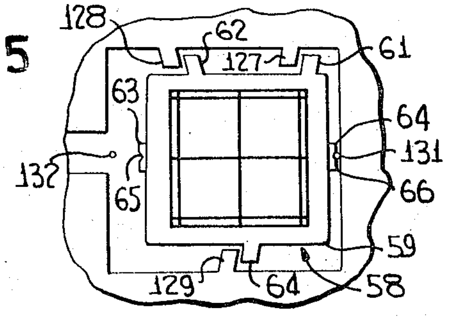
Figure 6:
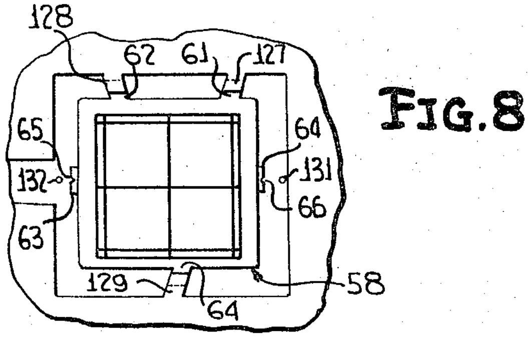

The manner by which the substrate pallet 58 and mask pallet 75 are positioned, in registration, at deposition station 47 is most clearly seen from FIGURES 5–8. Substrate pallet 58 is placed on U-shaped carrier 49 in storage station 45 so that arm 81 carries it to deposition station 47 in a manner whereby the side of the pallet that carries tabs 61 and 62 is next to the hooks 127 and 128 while tab 64 is adjacent to hook 129. As seen in FIGURE 5, arm 81 carries substrate pallet 58 to the deposition station so that tabs 61, 62 and 64 are all to the right of the corresponding hooks 127, 128 and 129, respectively. Substrate pallet 58 is thereafter lifted above the horizontal surfaces of hooks 127–129 and arm 81 is rotated counter clockwise. After counter clockwise rotation of arm 81 so that tabs 61, 62 and 64 are aligned approximately with hooks 127–129, as illustrated in FIGURE 6, arm 81 is lowered so that the hooks carry the tabs and the substrate pallet.

Figure 7:
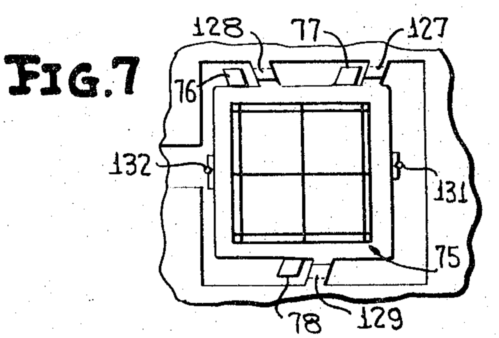

Arm 81 thereafter returns to storage facility 45 to pick up a selected mask pallet 75 from U-shaped carrier 49. Pallet 45 is transferred to the deposition station so that its tabs 61, 62 and 64 are respectively to the left of hooks 128, 127 and 129, as seen in FIGURE 7.

Pallet 75 is then raised by arm 81 so it contacts substrate pallet 58 that was previously carried by hooks 127–129. Both pallets 58 and 75 are now lifted to a position above hooks 127–129 so that mask pallet tabs 76–78 are above and to the left of hooks 127–129.

Pallets 58 and 75 are thereafter translated in a clockwise direction by arm 81 towards fixed pin 131 until the pin is engaged by notches 66 on the right side of both pallets. The pallets are then lowered into position so that mask tabs 76–78 respectively engage hooks 128, 127 and 129.

During each of the foregoing operations, bellows 141 was actuated so that pin 132 was swung to its position furthest from pin 131. After pallets 58 and 75 are placed in the position illustrated in FIGURE 8, whereby the tabs on the latter are carried by hooks 127–129, bellows 141 is deactivated and pin 132 engages grooves 66 with sufficient force to place the pallets in registration. Pins 131 and 132 in combination with hooks 127–129 now firmly hold the mask and substrate pallets 58 and 75 in complete registration, even if an electrical or pneumatic failure occurs in the system. Also, any leak that may be in bellows 141 or the line leading thereto has relatively little effect on the deposition operation since only atmospheric pressure is exerted inside the bellows 141 after registration is attained, i.e. while evaporant is being deposited on the substrates.

Figure 8:
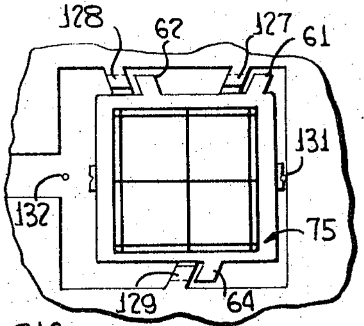

After the vaporized material has been deposited to the required thickness, mask pallet 75 is removed from deposition station 47 by proceeding in the opposite manner illustrated in FIGURES 7 and 8. Substrate pallet 58 now remains at the deposition station 47 while mask pallet 75 is being returned to storage station 45. A new mask pallet can then be picked up by arm 81 and transferred back to the deposition station and positioned in registration with substrate pallet 58. The new mask pallet includes an outline to provide a differing circuit configuration for the film deposited. This is necessary when it is considered that materials deposited on substrate 71 are resistances, semi-conductors and capacitors. For different circuit elements, different materials must be employed and the different materials are generally formed as films having differing geometric shapes.

Only after formation of a complete circuit, including several thin film layers on the substrates carried by pallet 58, located at the deposition station 47, is the pallet 58 returned to storage station 45. When the completed thin film circuit has been returned to storage station 45, a new substrate pallet is transferred from the storage station to deposition station 47 and a new set of thin films is fabricated. The thin film circuits carried on the second pallet may be identical with the circuits formed on the substrates carried by the first pallet or they may be different depending upon the requirements for the various circuits and the capacity of the storage racks for carrying a large number of substrate masks and pallets.

As an added feature, the resistance of resistor or semiconductor films can be automatically monitored with the present invention. This is accomplished by inserting a "monitoring" substrate 143 (FIGURE 13) in substrate pallet 58, in the area between flange 68 and cross member 69 in the longitudinal direction between tab 65 and the pallet that carries tab 64. Substrate 143 carries a pair of low resistance, separated pads 144. On mask 79, at a position aligned with a straight line between pads 144 is provided a cutout elongated aperture 145, FIGURE 11, whereby a film of material deriving from evaporant station 46 can be deposited between pads 144. As part of mask pallet 75, at either end of aperture 145, aligned with pads 144, are spring like contacts 149 and 161 that are engaged to the pads. Contact 149 is mounted on 75 so that it is electrically insulated from the remainder of the pallet 75.

One of the pads 144 is connected to spring like contact clip 146 through vertically extending post 147. Post 147 projects through frame 59 of pallet 75 and is carried by horizontally extending conductor 148, that extends inwardly along frame 59. Post 147 and conductor 148 are electrically insulated from pallet 75 by being respectively mounted on an insulating washer and strip, both of which are not shown, but are carried by the pallet. Conductor 148 extends inwardly from frame 59 and terminates in the area between the edge of the frame and cross member 69. At the termination of conductor 148 there is provided an upwardly projecting hemispherical contact 151 that forces spring contact 149 into engagement with one of pads 144. Thereby, an electrical connection is established between said one pad 144 and clip 146 and this pad is completely insulated from pallets 58 and 75.

Contact clip 146 extends in a generally upward and outward direction to a position adjacent flange 152 of registration bracket 135. Contact clip 146 is electrically insulated from flange 152 by microwasher 153 that also carries screw 154 in insulating relationship with bracket 135. Between nuts 155 on screw 154, is provided a pair of nuts 155, positioned to engage contact 156 that is electrically connected to lead 157. Thereby, a signal, insulated from the ground potential at which pallets 58 and 75 are maintained, can be derived on lead 157.

To provide a ground connection between the other one of pad 144 and pallet 75, the pallet carries in spaced relationship with lead 148 and hemisphere 151 a further lead 158 to which is attached a hemispherical contact 159. Hemispherical contact 159 is aligned with spring contact 161 on mask 79 so that the spring contact engages pad 144 to provide a ground connection between pallet 75 and the other one of pads 144.

As resistive or semiconductive evaporant is deposited on monitoring substrate 143 between pads 144, as determined by slot 145, the resistance between pads 144 decreases. By measuring the resistance between pads 144 with a bridge that has one arm connected to ground and lead 157, it is possible to determine the thickness of a resistive or semiconductive thin film layer deposited on substrate 71.

Deposition station 47, in addition to including the registration and resistance monitoring apparatus, is provided with heater unit 162 for selectively elevating the temperature of substrates 71 prior to, during and subsequent to the deposition operation. Substrate heater 162 includes a plurality of elongated heating lamps 163 having tubular quartz envelopes. At opposite ends of each lamp envelope are provided electrodes 164, that engage stainless steel hemispherical contacts 165. Contacts 165 protrude inwardly from one leg of vertically extending flanges 166 on molybdenum, U-shaped spring contact strip 167. A pair of contact strips 167 is provided, one on either side of bracket 135 that carries the substrate heater. The side of U-shaped contact strip 167 remote from contacts 165 extends along the exterior side of a vertically extending wall of bracket 135. These sides of strip 167 are connected together by bar 169, fixedly mounted on bracket 135 by screws 172 and bolts 173. The left one of contact strips 167, as viewed in FIGURES 28 and 30 and the one shown in FIGURE 28*a*, is maintained at a potential other than ground potential through its connection to lead 174 because that strip is insulated from bracket 135 by virtue of electrically insulating mica and boron nitride, washers 175 that space the contact strip from the bracket housing. The other one of contact strips 167 is connected directly to the ground potential of bracket 135 by omitting the insulating washers. Thus, power is supplied to heating elements 163 by connecting one terminal of an appropriate A.C. source to lead 174 and by grounding the other source terminal.

To prevent the heat generated by heating lamps 163 from escaping away from the deposition area so that the substrates can remain at an elevated temperature during deposition, temperatures that may range as high as 1,000° C., a series of heat reflecting bottomless boxes 176 is provided around the sides and upper surface of the lamps. Reflecting boxes 176, four of which are preferably provided in stacked relationship, are fabricated from molybdenum so that they do not give off vapor for the high temperatures encountered. The lower edges of three of boxes 176 are supported by the floor of bracket 135. The vertically extending sides of the open bottomed boxes are provided with appropriate slots 177 to enable the narrowed necks 178 of lamps 163 to extend through the boxes. Slots 177 extend just above necks 178 so that the innermost box is carried by the lamp necks. To maintain boxes 176 in fixed predetermined positions, aluminum oxide ($Al_2O_3$) rods 179 are placed between them with the longitudinal axes of the rods, substantially at right angles to the longitudinal axes of lamps 163. Boxes 176, by confining the heat from lamps 163 to the area within and immediately below deposition station 47, effectively isolate movable parts in the chamber from the lamps. Thereby, temperature and thermal expansion of moving parts is minimized and the frictional problems frequently occurring with their expansion and high temperatures are avoided. Also massive parts are thermally isolated; this results in more rapid heating and cooling of the heater and pallets which have relatively low mass and, therefore, low heat capacity.

To monitor the temperature of substrate 71 during a deposition operation, a centrally located, circular aperture 182 is provided in each of the reflecting boxes 176. Through aligned apertures 182 extends lead 183, having mounted at the lower end thereof a temperature monitoring thermocouple 184. To maintain lead 183 and thermocouple 184 in constant vertical position, the lead is secured to the outer reflecting box by means of molybdenum retaining clip 185.

A further segment of deposition station 47 comprises shutter 186, FIGURES 24–27, that is selectively activated so it prevents the passage of vaporized material from evaporant station 46 to substrates on which films are being formed. Activating mechanism 187 for shutter 186 is carried on the top surface of plate 152 and includes vertically extending output shaft 188 that extends through plate 52. Vertically extending shaft 188 is secured to shutter 186 by means of screw 189 so that the shutter is positioned in a horizontal plane slightly below the other portions of deposition station 47. Shaft 188 is driven at its end opposite to screw 189 by crank wheel 191. At a point remote from the center of wheel 191 and shaft 181, arm 192 is connected to the wheel by pin 193. The other end of arm 192 is pivotably connected to flange 194 that is part of the movable bellows head. Bar 195 is normally held in the position shown in FIGURE 27 by being connected to one end of extension springs 196, the other ends of which are secured to hollow threaded bushings 197, that are carried on bar 198.

Bars 195 and 198 are connected together by screws 199 that extend between them. The minimum and maximum distances between bars 195 and 198 are determined by the positions of nuts 202 and 203 on screws 201. By adjusting springs 196 with micrometer settings 197, it is possible to set the speed and direction of motion of shutter 196 as bar 195 is retracted toward bar 198.

Shutter 186 is translated from the dotted position illustrated in FIGURE 24 to the solid line position illustrated, covering the mask and substrate pallets 75 and 54, in response to air being supplied by air line 203 to bellows 1204. Activation of bellows 1204 in response to pneumatic pressure applied thereto results in movement of bar 195 away from bar 198 and rotation of arm 192 about pivot 190. Rotation of arm 192 about pivot point 190 causes rotation of eccentrically driven wheel 191 180° in a clockwise direction, so that shutter 186 is likewise driven in a clockwise direction to the position, indicated by the dotted lines in FIGURE 27, covering the registration location of pallets 58 and 75.

When the air pressure in bellows 1204 is removed, springs 196 return bar 195 to its normal position, illustrated in FIGURE 27 by solid lines, and shutter 186 is rotated away from the registration location of pallets 58 and 75 so that evaporant may reach the substrates upon which films are being formed. Shutter 186 is activated to prevent the flow of evaporant to substrates upon which films are being deposited. It is frequently necessary to cut off the flow of evaporant to the substrates quickly if films of very precise thickness are being formed. Shutter 186 also is usually employed during outgassing operations to prevent contaminating materials from reaching the deposition station.

Reference is now made to FIGURES 16–18, 22, 23, 23*a* and 23*b* wherein details of evaporant station 46 are illustrated. Station 46 comprises a turntable 204 having six separate evaporating sources 205–210 located about its circumference. One of the sources 205–210, carried by turntable 204, is selectively positioned to be within annular heating source 212 in response to rotational drive of the turntable by drive mechanism 213. During activation of drive mechanism 213, heating source 212 is lifted out of engagement with sources 205–210 in response to energization of pneumatic lifter 214.

The construction of heating source 212, utilized for supplying energy to evaporate the metal, semiconductor or dielectric material located at one of sources 205–210, is best seen by reference to FIGURES 23 and 23*a*. Source 212 includes an annular filament or cathode 215 that is heated by an A.C. power source supplied to it via leads 216, terminal 217 and lead 218.

For many applications, electron bombardment heating is necessary so that cathode 215 must be fabricated of a material having a high work function so that a copious supply of electrons may be derived. For electron bombardment heating, a high voltage D.C. source, 5000 volts, is connected to the heater assembly via lead 219 and is coupled through the heater terminal post contact finger 220. Contact finger 221 engages leaf spring contact 222 that is carried by the source and connected to its holder by centrally located, metal stem 223. Stem 223 extends upwardly from its base 224', to which spring contact 222 is secured, to support crucible 224 that has located interiorly thereof a suitable source material 225.

In the alternative, for materials having very high vaporization temperatures, crucible 224 is dispensed with and the source is carried directly by stem 223, as indicated in FIGURE 23*b* for rhenium source 230. If the material being vaporized has a low vaporization temperature, whereby electron bombardment is not required for heating, high voltage lead 222 can be eliminated from the source. In that event, filament 215 supplies sufficient heat energy to the source being evaporated. (Heat is transferred by radiation.)

When direct electron bombardment is required, as in the case of sources 207 and 210, metal focusing disc 227 is included in the evaporant source station. Disc 227 is carried by metal cylinder 1228 that is connected to ground so that a ground plane potential exists between the high voltage on stem 223 and electron source 215. In consequence, electrons from source 215 bombard crucible 224 at a point slightly above the plane of focusing disc 227, close to the apex of source 226. Electron bombardment of crucible 224 results in sufficient kinetic energy being transferred thereto to enable source 225, within crucible 224 to be evaporated. Direct bombardment of rhenium slug 230, FIGURE 23*b*, by electrons from filament 215 results in sufficient kinetic energy being imparted to the rhenium to enable direct vaporization thereof.

To control the flow of evaporant from any of the sources, and contain the heat energy derived only to a small volume, proximate to the source being heated, heater 212 is provided with cylindrical reflectors 228, 231, and 232. Within heat reflecting cylinder 228 is located a pair of concentric heat reflecting cylinders 231 and 232, respectively, having smaller heights and dimensions than cylinder 228. Cylinders 228, 231 and 232 are all provided with top rings 233 having circular apertures 234 therein. The diameters of openings 234 in rings 233 and 235 are progressively greater as the distance between the base of crucible 224 and the corresponding ring decreases. Since each of cylinders 228, 231, 232, and rings 233 and 235 is fabricated from radiant heat reflecting material, most heat energy derived within heater 212 does not escape to the remainder of the vacuum chamber. Additional heat insulation is provided by three stacked, annular reflectors 236 that substantially cover circular aperture 240 in base plate 237, through which aperture cylinder 1228 and stem 223 extend. Reflectors are mounted on metal standards 239 beneath base plate 237. Standards 239, hence reflectors 236 and disc 227, are electrically and mechanically connected to the ground potential of turntable 204. A cylindrical vapor trap 229 is located at the upper end of heater 212 to intercept vapor that would otherwise spread out and deposit on equipment other than the substrates. It is cool enough so that vapor which condenses on its inner surface does not re-evaporate during subequent depositions. It is used to help keep the system clean.

Because crucible 224 extends slightly above top 233 that covers cylinders 231, evaporant from source 225 cannot condense inside the heater. This eliminates the possibility of re-evaporation from the interior heater surfaces during subsequent depositions and, thus, prevent contamination of films. Dimensions are such that vapor is permitted to travel to all portions of the substrate pallet 58 in the deposition station 47.

Because reflectors surround on one evaporant sources 105–110 during each deposition operation, it is required for the reflector and heater assembly to be driven out of engagement with the sources during rotation of turntable 204. This is accomplished with pneumatic lifter mechanism 214 that lifts heater 212 completely away from the source. To enable filament 215 and rings 233 and 235 to be lifted clear of the top of crucible 234, the filament and the ring openings 234 must be of sufficient diameter to prevent engagement of them with the top edge of the crucible.

To pivot the heater assembly 212 upwardly away from the source previously being vaporized, base plate 237, carrying the complete heater assembly, is rigidly connected to arm 241 that is pivoted for rotation about pin 242, FIGURE 16. Arm 241 is connected to activating rod 243 by pin 244 that is located in close proximity to the end of the arm that is connected to pin 242. Rod 243 is driven by pneumatically energized bellows 245, the activator for pneumatic lifter 214, whereby arm 241 is rotated upwardly to drive the heater assembly out of energy exchange relationship with crucible 224 and source 225. The maximum extent to which arm 241 can be rotated is determined by the length of wire rope 246 that is connected at its upper end to a point approximately midway between the ends of arm 241 and at its other end to floor 248 on the housing for lifter 214. The maximum height of arm 241 is controlled by the length of the wire rope 246.

When air pressure is removed from bellows 245, arm 241 is returned to its initial position in response to the restoring force applied to stud 249 at the end of the arm remote from pin 242, by springs 251. The other ends of compression springs 251 are anchored to the side wall 253 of lifting mechanism 214 between floor 248 and arm 241. The lower position of the arm 241 is controlled by contact with an adjustable stud 254 which is threaded into the floor 248 and locked in position by jam nut 255.

Details of the bellows 245 employed for activating lifter 214 are best seen by reference to the cross sectional view, FIGURE 18. This activator, while disclosed specifically only for lifter 214, is also generally employed at each of the other stations where bellows operation is employed for activating the various mechanical movements.

The use of the pneumatic bellows, rather than electric motors or solenoids, is preferred because bellows are capable of operating at high temperatures and low vapor pressure, such as exists within bell jar 41. In contrast, electric motors and solenoids have organic materials that seem to be subject to vaporization at the temperatures and vapor pressures that prevail within bell jar 41. Because the pneumatic activators can be placed directly within bell jar 41, without problems of organic vaporization and contamination, the need for placing actuators exteriorly of the chamber or in cool regions of the chamber and connecting them through complex mechanical linkages is obviated. Another advantage attendant with the use of bellows actuators is that the force of the actuator is adjustable in both directions that its output element moves. Regulation in one direction is attained by controlling the pressure applied to the bellows and in the other direction by adjusting the tension of the springs that return the actuators to their normal, unactivated position. Still another advantage in the use of bellows actuators resides in the ease with which activation speed is adjusted. Speed adjustment is attained merely by controlling needle valves which throttle air flow at the inlet and exhaust ports of a valve connected to the air line leading to the bellows.

The actuator for bellows 251, FIGURE 18, includes a hollow cylinder 256 having its axis coincident with the longitudinal axis of the foldable bellows. Riding within cylinder 256 is piston 257 having an enlarged spherical portion 258 at its lower end. The upper end of piston 257 is connected to output rod 248 that is integral with cover plate 259 to which the upper end of bellows 251 is arc welded. The lower end of sphere 258 communicates through passage 261 to air line 262 that is fabricated of ⅛" outside diameter stainless steel tubing.

Air from passage 259 acts directly upon the lower end of the sphere 258 and escapes into the chamber between cylinder 256 and the interior walls of bellows 251 through slots 262. The resulting air pressure acting against the lower end of sphere 258 and within the chamber 263 causes expansion of the bellows and translation of rod 243 away from the fixed bellows head to which air line 261 is connected. Air from chamber 263 builds up pressure within cylinder 256 due to the connection of the interior of the cylinder to the chamber through circular opening 264 at the top of the cylinder.

The use of a spherical head 258 engaging the interior walls of cylinder 256 permits some lateral translation of bellows 251. This is necessary because pin 244 moves through an arc about pin 242. The constraint provided by the cylinder 256 and piston 257 prevents buckling of the bellows 251.

To control rotation of turntable 204 accurately so that one of sources 205–210 is positioned immediately below deposition station 47, activator 213 illustrated in detail in FIGURES 19–21 is provided. Turntable 204 is mounted on rotor 266 which is mounted on shaft 265 connected thereto at its top and bottom by bearings 267 and 268. Rotor 266 and turntable 244 are fixedly secured to each other by screws 269. The shaft and bellows are fixedly secured on mounting plate 272 that is in turn mounted on the top surface of base plate 42 by screw 272.

To limit rotation of turntable 204 to one-sixth of a revolution each time air is supplied by line 274 to bellows 275, bellows output rod 276 is pivotably connected to one end of arm 277, having pawl 278 at its other end. Pawl 278 engages a tooth on ratchet wheel 279 that is fixedly mounted on rotor 266, which is connected to turntable 204. Six teeth are provided around the periphery of ratchet wheel 279 so that each time bellows 275 is activated, pawl 278 is extended to the right, as viewed in FIGURE 19, to the next tooth on the ratchet wheel. Deactivation of bellows 275 in response to removal of air pressure from line 274 results in translation of bar 282, rod 276 and arm 277 to the position illustrated in FIGURE 19 due to the restoring force of springs 281.

Springs 281 are carried in sleeves 292 on plate 283 and are connected to bar 282. Nuts 285 and 286 on screws 284 limit maximum travel of pawl 278, as illustrated in FIGURE 19.

When bellows 275 is activated, arm 277 rotates on pin 292 counterclockwise, as viewed in FIGURE 19, about rod 276 and is at the same time translated to the right. Arm 277 is pressed against the ratchet 279 by spring 293, one end of which is connected to bar 282 by screws 294. As indicated supra, the slight rotation of arm 277 relative to rod 276 enables pawl 278 to pass over the following tooth an ratchet 279.

Upon deactivation of bellows 275, shaft 265 is rotated in a counterclockwise direction, exactly one-sixth of a revolution. Rotor 266 does not rotate in excess of one-sixth of a revolution due to the forces applied by brake 287 and detent wheel 288, an integral part of rotor 266. The notches 291 on wheel 288 engage detent 289 when bellows 275 is not moving to the left. After bellows 275 has been activated and springs 281 draw arm 277 to the left, resulting in rotation of shaft 265 and detent wheel 288, detent 289 rides out of the notch 291 it formerly engaged on wheel 288 and rotates about shaft 295.

Shaft 295 is mounted on lever arm 296 that is pivoted about pin 297 at one of its ends. The other end of arm 296 is connected to extension spring 298 that is fixedly mounted on plate 272 so that it extends generally at right angles to the longitudinal axis of arm 296. When pawl 278 rotates rotor 266 exactly one-sixth of a revolution, a notch on wheel 288 again engages detent 289 and the detent sits firmly in that notch in response to the restoring force of spring 298 on lever arm 296.

The positive action of detent 289 in the notches of wheel 288 is augmented by the effect of brake 287 on shaft 265 with which it is always maintained in frictional contact. The frictional contact is attained by virtue of the connection of brake 287 to one end of spring 299, the other end of which is tied to wire clamp 201 that is secured to plate 283 by screw 302. The former is pivoted around pin 303 at its end opposite to the connection with spring 299.

A schematic representation of the apparatus utilized to activate registration controlling bellows 141, shutter bellow 1204, heater lift bellows 251 and turntable 204 indexer bellows 275 is shown in FIGURE 9.

Each of these bellows is maintained in the vacuum chamber and is connected to appropriate valves by way of stainless steel tubing 304 having a one-eighth inch outer diameter. Tubing 304 is connected to copper tubing, having a quarter inch outer diameter, at feed through points 305 in base plate 42. Stainless steel tubing is utilized interiorly of the vacuum deposition chamber because it does not contaminate the vacuum within the chamber.

Copper tubing is utilized exteriorly of the chamber because it is inexpensive.

Exterior of the vacuum deposition chamber, each of lines 305 is connected to a different one of solenoid controlled valves 307. Each of valves 307 is provided with an exhaust throttle 308 for determining the rate at which air is exhausted from lines 305 and 304 when its respective valve is closed. Air is supplied to each of the valves 307 at controlled velocities through inlet throttles 309, one of which is provided on the inlet side of each of the valves. Inlet throttles 309, in combination with exhaust throttles 308, control the speed with which the various bellows and the mechanical mechanisms coupled thereto are activated.

Pressure supplied to inlet throttles 309 that are coupled to bellows 1204 and 141 is maintained at approximately 90 pounds per square inch gauge by means of pressure regulator 311 and relief valve 312. Pressure in the line downstream of regulator 311 is monitored with pressure gauge 313. In a similar manner, pressure regulator 313 feeds 70 pounds per square inch gauge air pressure to throttle valves 309 that are coupled to bellows 251 and 275. Less pressure is utilized for controlling bellows 251 and 275 than is necessary for activating bellows 1204 and 141 because greater forces are necessary to activate shutter 186 rapidly and to engage pin 132 forcibly against V notches on substrate pallet 58 and mask pallet 75. Air suppply 314 feeds 120 pounds per square inch gauge pressure air through tubes 314 to pressure regulators 311 and 313, to provide the necessary pressure on the downstream side of these regulators.

To control activation of valves 306 connected to bellows 1204, 141, 251 and 275, solenoid activators 316–319 are respectively provided. Each of solenoids 316–319 is selectively connected to a 115 volt 60 cycle supply line at terminal 321 through the contact of switches 322–325.

Contact 322 for solenoid 316 that controls the activation of shutter bellows 1204 is in the form of a three-position switch that may be either open-circuited, connected manually to the A.C. source at terminal 321 or to a signal source at terminal 326. The potential at terminal 326 is normally zero so that bellows 1204 is not activated. When the impedance between pads 144 on the monitoring substrate 143 decreases to a value indicative of the desired thickness of the film being formed, a resistance monitoring bridge automatically derives a signal that is applied to terminal 326. The application of the signal to terminal 326, with switch 322 being connected thereto, results in activation of solenoid valve 306 coupled with bellows 1204. When this valve is activated, shutter 186 is promptly swung from its normal position into a position where vapor no longer reaches substrates 71 at deposition station 46. Hence, the thickness of the film formed on monitoring substrate 143 is utilized to automatically control when shutter 186 is activated. To return shutter 186 to its normal unactivated position, the operator merely returns switch 322 to its open position. When a subsequent film is formed on the same substrate, it is necessary for the operator merely to rebalance the bridge that applies signal to terminal 326 and the same monitoring substrate may be employed with switch 322 again connected to terminal 326. Of course, if a dielectric film is being formed on substrate 71, or if it is not desired to control shutter 186 automatically, switch 322 is positioned manually so that it is selectively connected with terminal 321 for the duration necessary to form a film of desired thickness.

While arm 81 is positioning substrate pallet 58 and mask pallet 75 on hooks 127–129 at deposition station 47, the operator activates contact 323 so that power is supplied from terminal 321 to solenoid 317. In consequence, bellows 141 is activated to rotate pin 132 away from pin 131. After both pallets 58 and 75 have been placed on hooks 127 and 129, the operator opens switch 323, whereby air is removed from bellows 141 and pin 132 is forcibly brought into contact with V notches 67 on pallets 58 and 75.

When a particular material has been deposited to the required thickness on substrate 71 and it is required to deposit a different material on the substrate, the operator activates switch 324 to supply power from terminal 321 to solenoid 318. Activation of solenoid 318 results in air being supplied to bellows 251 and rotation of heater 212 out of its surrounding position with the previously utilized evaporant source. After heater 212 has been lifted out of engagement with the evaporant source, and while it is rotated upwardly, the operator closes switch contacts 325 so that power is supplied from terminal 321 to solenoid 319 to activate source turntable bellows 275. Activation of bellows 275 results in rotation of turntable 204 by 60 degrees to bring a different evaporant source directly beneath deposition station 47 is not the material desired to into vapor exchange relationship with deposition station 47 is the desired material for forming the next layer on substrate 71, contact 324 is open circuited and heater 212 is returned to its position proximate turntable 204, whereby the newly selected source is heated to temperatures required for vaporization. If, however, the source brought beneath deposition station 47 is not the material desired to be now deposited upon substrate 71, spring biased switch 325 is again activated, bellows 275 is energized and turntable 204 is rotated an additional sixty degrees. In this manner, turntable 204 is rotated until the material desired for the next deposition step reaches a position directly beneath deposition station 47.

Thus, the finished circuit configuration as illustrated in FIGURE 15 comprises an insulating substrate 71, usually of quartz or glass, upon which is deposited a plurality of thin film resistors 327 having thicknesses of the order of 5000 Angstrom units. After resistors 327 are formed, the pallet carrying the previously utilized mask is returned to storage station 45 by carriage 46. A new mask pallet 75 is then transferred from storage station 45 to deposition station 47 and low resistance conducting paths 328 are deposited between certain terminals of resistors 327 and the edge of substrate 71. The low resistance deposition operation is accomplished only after a different evaporant source than was utilized for resistors 327 is placed beneath station 47. After pads 328 are formed on substrate 71, a semiconductor source is rotated beneath deposition station 47. A new mask, having a geometrical configuration corresponding with semiconductor strips 329 on substrate 71, is now transferred from storage station 45 to deposition station 47. After semiconductor layers 329 are formed on substrate 71, dielectric layers can be formed by positioning a new mask pallet at deposition station 47 and rotating turnable 204 until a dielectric containing crucible is located directly beneath deposition station 47. It is now evident that with the present invention multiple thin film circuits having virtually any desired configuration can be fabricated without ever having to remove bell jar 41. A multiplicity of such circuits is easily fabricated merely by providing sufficient number of storage stations 45 within the bell jar.

Reference is now made to FIGURES 31–33 wherein a further embodiment of the present invention is specifically illustrated. In this embodiment, pallets 58 and 75, located in storage station 45 on U-shaped carriers 49, are normally shielded from the remainder of the vacuum deposition chamber by means of telescoping boxes 331 and 332, the latter being concentric with and almost touching the exterior surface of the former. Boxes 331 and 332 ride on standards 333 that extend between base plate 43 and top plate 52.

The upper surface of exterior box 332 is connected to pulley wires 334 and 335 that extend around pulleys 336 to counterweights 337 and 338, respectively. To provide maximum travel for box 332, pulleys 336 are mounted on the upper surface of plate 52 and wire 335 extends through aperture 339 in the plate. Counterweights 337 and 338 exert sufficient force on box 332 to enable the box to remain at the same position to which it is driven. Box 332 is driven vertically by arm 81 in response to the arm engaging the upper or lower surface of the flange 339, an integral part of box 332 that extends from one of its corners to the outside edge of standard 333. If it is desired to raise box 332 so that access may be had to a pallet stored on one of the U-shaped carriers 49 at storage station 45, it is merely necessary to bring arm 81 beneath flange 339 and then raise the arm. Box 332 will remain in the position to which it is driven so that arm 81 is able to remove the substrate or mask pallet that it is desired to be transferred to deposition station 47. After the substrate and mask pallets have been transferred to deposition station 47, and before power is applied to filament 215, arm 81 returns to storage station 29, engages the upper edge of flange 339 and returns telescoping box 332 to its lower position, indicated by dashed lines 341, FIGURE 33.

By shielding substrates 71, contained in station 45, from the remainder of the vacuum deposition chamber, any possibility of contaminants of stray evaporants reaching the storage substrates is virtually eliminated. Of course, this is a desirable feature when it is considered that in order to form highly adhesive films having predictable electrical characteristics it is necessary that the substrates and films be as pure as possible.

A further feature associated with the use of telescoping boxes 331 and 332 is that the substrates and masks can be preheated effectively prior to their transfer to deposition station 47. This is a desirable feature, saving considerable time in utilization of the facility since many substrates must be heated prior to and subsequent to a deposition step. Heating of substrates stored on carrier 49 is obtained through heating arrays 342 and 343, respectively mounted at the top and bottom of the vertical travel of boxes 331 and 332.

Arrays 342 and 343, respectively connected to base plated 43 and top plate 52 by posts 344 and 345, are constructed in essence like heater 162 at deposition station 47. The only difference, in substance, is that U-shaped molybdenum contact strips 171 at the deposition station are replaced with straight strips. This change is made so that telescoping box 332 is able to slide over heater arrays 342 and 343. It is not required that the strips in arrays 342 and 343 be U-shaped, as they are at deposition station 47, because the 1000° C. temperatures sometimes attained at the latter station are never required during storage. Thus, the need for resilient strips that are able to expand and contract sufficiently with great variations in temperature is not required of arrays 342 and 343.

While embodiments of the facility of the present invention have been described as manually actuated, it will be apparent that the facility may be completely or partially automated, using position servo mechanisms, for example.

Another modification is to employ plural storage racks. If plural racks are provided, one would be utilized for storing masks and one for storing substrates. The angular positions of these racks are indicated in FIGURE 4 by the ordinates $\theta_m$ and $\theta_s$, respectively. In transferring a mask substrate pallet from the mask rack, arm 81 is lowered to $y_{sm}$ along the angle $\theta_a$ and then rotated from $\theta_a$ to $\theta_s$. Arm 81 is then driven upwardly by $\Delta y_s$ to pick up the substrate pallet and clear the vertical sides of U frame 49 and rotated back to $\theta_a$. Arm 81 is now raised to $y_a$, where it is rotated to $\theta_b$, the angular position of deposition station 47. It is thereafter lowered to set the substrate pallet in place and continues downwardly to $y_m$, the vertical position for the next mask pallet to be positioned at deposition station 47. Arm 81 is then rotated to $\theta_m$, after which it is raised $\Delta y_m$ to pick up the mask pallet so that pallet clears the U-shaped carrier at the second storage rack. Arm 81 is then rotated back to $\theta_b$, from whence it carries the mask pallet upwardly to $y_a$, so that it also picks up the substrate pallet. Arm 81 is now rotated to $\theta_a$ so that the tabs on the mask pallet are approximately aligned with the hooks at the deposition station 47. Arm 81 is thereafter lowered to $y_b$ so the mask pallet is placed on the deposition station hooks and carries the substrate pallet on its upper surface. To return the mask and substrate pallets to $\theta_m$ and $\theta_s$, respectively, the opposite operation sequence is employed.

While I have described and illustrated one specific embodiment of my invention, it will be clear that variation of the details of construction which are specifically illustrated and described may be resorted to without departing from the true spirit and scope of the invention as defined in the appended claims.

What I claim is:

1. A vacuum vapor deposition facility for forming thin film circuits on insulating substrates comprising rack means for storing plural pallets, said pallets carrying substrates and masks determining the circuit configuration deposited on said substrates, a station for evaporating materials to be deposited onto said substrates, a station for holding a substrate carrying pallet in registration with a mask carrying pallet, said holding station being positioned downstream of said evaporating station to receive the material evaporated, and means for transferring said pallets between said rack and said holding station.

2. A vacuum vapor deposition facility for forming thin film circuits on insulating substrates comprising means for storing plural substrates and masks, said masks determining the circuit configuration deposited on said substrates, a station for evaporating material to be deposited onto said substrates, a station for holding said mask and substrates in registration, said holding station being positioned downstream of said evaporant station to receive the material evaporated, and means for picking up said substrates and said masks and for carrying said substrates and masks, after they have been picked up, between said storing means and said holding means.

3. A vacuum vapor deposition facility for forming thin film circuits on insulating substrates comprising rack means for storing plural pallets, certain of said pallets carrying said substrates and others of said pallets carrying masks determining the circuit configurations deposited on said substrates, a station for evaporating material to be deposited onto said substrates, a station for holding a substrate carrying pallet in registration with a mask carrying pallet, said holding station being positioned downstream of said evaporating station to receive the material evaporated, said pallet being arranged in said holding station so that the substrate carrying pallet is downstream of said mask carrying pallet, and means for transferring, one at a time, said pallets between said rack and said holding station.

4. A vacuum vapor deposition facility for forming thin film circuits on insulating substrates comprising rack means for storing plural pallets, certain of said pallets carrying said substrates and other of said pallets carrying masks determining the circuit configuration deposited on said substrates, a fixed radius arm, means for moving said arm rotatably about a rotation point and in elevation, a station for evaporating material to be deposited onto said substrates, a station for holding a substrate carrying pallet in registration with a mask carrying pallet, said holding station and said holding rack being positioned approximately the same radial distance from the rotation point of said arm whereby said arm transfers said pallets between said rack and said holding station, said holding station being positioned downstream of said evaporating station to receive the material evaporated.

5. The facility of claim 4 wherein each of said pallets is of approximately the same width and the parallel sides along said width are provided with substantially aligned V notches, said holding station comprising a pair of pins separated from each other approximately by the width of said pallets, said pallets when brought to said holding station having said V notches engaged by said pins, and means for moving one of said pins selectively away from the other of said pins and for returning said one pin to the position whereby it is separated from the other pin by the same distance as the width of the pallet with sufficient force to effect registration of a pair of pallets at said holding station.

6. The facility of claim 4 further including a shield for covering said rack means, said shield being selectively translated by said arm so that the pallets stored on said rack are accessible to said arm.

7. The facility of claim 6 further including means for heating the substrates and masks stored in the pallets in said rack means.

8. The facility of claim 4 wherein said evaporating station includes a plurality of evaporant sources, means for selectively positioning one of said evaporant sources at the same radial distance from the rotation point of said arm as said holding station and beneath said holding station.

9. The facility of claim 8 wherein said station for evaporating material includes a single heating source, means for moving said heating source into and out of engagement with the evaporant source positioned at the same radial distance from the rotation point of said arm as said holding station.

10. The facility of claim 9 wherein said heating source comprises an annular source of electrons and includes means for maintaining the evaporant holder at a D.C. potential necessary to attain acceleration of said electrons between said source thereof and the evaporant material, said evaporant source being surrounded by means for focusing said electrons onto said material.

11. The facility of claim 10 wherein certain of said evaporant sources are provided with contact means selectively connected with said means for maintaining said D.C. potential.

12. The facility of claim 9 further including means for enabling said heating source to be moved out of engagement with an evaporant source only while said evaporant sources are stationary.

13. The facility of claim 12 wherein said means for moving said evaporant source and said means for moving said heating source are both pneumatically activated by bellows located interiorly of said facility.

14. The facility of claim 13 wherein said evaporating station comprises a turntable on which $n$ of said evaporant sources are located, where $n$ is an integer in excess of one, and means, including one of the pneumatic activators, for rotating said turntable, $1/n$th of a revolution each time said one pneumatic activator is energized.

15. The facility of claim 13 wherein said heating source is mounted to be vertically pivoted in response to activation of one of the pneumatic activators.

16. The facility of claim 9 further including reflective means substantially surrounding the heater of said heating source when it is in situ relative to said evaporant material, said reflective means being provided with apertures for enabling vaporized evaporant to reach the holding station.

17. The vacuum vapor deposition facility of claim 4 further including shutter means, and means for selectively moving said shutter means into the vapor path between said holding station and said evaporating station.

18. The facility of claim 17 wherein said means for moving comprises means for rotating said shutter means in a substantially horizontal plane, said means for rotating including a pneumatically activated bellows located interiorly of said facility.

19. The vacuum vapor deposition facility of claim 4 wherein said holding station includes means for heating substrates located therein.

20. The facility of claim 19 wherein said heating means includes an array of elongated heating elements, said elements being arranged with their longitudinal axes parallel to each other, each of said elements having an electrode at the end thereof and spring clip means for engaging said electrodes.

21. The facility of claim 20 wherein said spring clips are substantially U-shaped, said U-shaped clips having a common base for all the electrodes located on one side of said elements.

22. The facility of claim 21 wherein said clips are fabricated from molybdenum.

23. The facility of claim 20 further including a plurality of stacked heat radiation reflecting boxes surrounding said heating elements on all sides except the side on which substrates are held, the side walls of said boxes extending between said electrodes and the major portion of said heating elements.

24. A vacuum vapor deposition facility for fabricating thin film circuits, said facility comprising:

a chamber capable of supporting adequate vacuum;

a plurality of stations within said chamber, including:

a station for storing at least one substrate adapted to carry a thin film circuit, and a plurality of masks adapted to establish the configuration of a thin film circuit to be deposited on said substrate, a station for accomplishing selective vaporization of evaporant source materials to be deposited on said substrate to form the thin film circuit, and a deposition station for retention of said substrate and selected ones of said masks in predetermined relationship during deposition of selected ones of said evaporant materials, said deposition station aligned to receive evaporant material vaporized at said selective vaporization station, each of said plurality of stations located about an axis within said chamber;

a carriage movable along and about said axis within said chamber for selectively retrieving and transferring said at least one substrate and said masks between said storage station and said deposition station as necessary to effect deposition of evaporant materials in the desired circuit configuration on the substrate.

25. The facility according to claim 24 wherein is provided means at least partially within said chamber for producing the selected operations and movement of said carriage with negligible introduction of contaminants into said chamber.

26. The facility according to claim 25 wherein said producing means comprises pneumatic actuators.

27. The facility according to claim 24 wherein said storage station includes stacked racks for supporting said at least one substrate and said masks.

28. The facility according to claim 27 wherein each of said at least one substrate and said masks is carried by pallet means, each pallet means including structure arranged and adapted to permit secure retention of the pallet means within a respective one of said racks and to permit engagement with a respective retaining member at said deposition station, as required during storage and deposition operations, respectively.

29. The facility according to claim 24 wherein is further provided means for monitoring the thickness of a film during deposition on said substrate.

No references cited.

CHARLES A. WILLMUTH, *Primary Examiner.*

R. I. SMITH, *Assistant Examiner.*